United States Patent
Tachibana et al.

(10) Patent No.: US 11,365,064 B2
(45) Date of Patent: Jun. 21, 2022

(54) CARGO HANDLING DEVICE AND CARGO HANDLING METHOD

(71) Applicant: ITOH DENKI CO., LTD., Kasai (JP)

(72) Inventors: Toshiyuki Tachibana, Kasai (JP); Masayuki Shimoda, Kasai (JP)

(73) Assignee: ITOH DENKI CO., LTD., Hyogo (JP)

( * ) Notice: Subject to any disclaimer, the term of this patent is extended or adjusted under 35 U.S.C. 154(b) by 0 days.

(21) Appl. No.: 16/958,248

(22) PCT Filed: Dec. 27, 2018

(86) PCT No.: PCT/JP2018/048023
§ 371 (c)(1),
(2) Date: Aug. 26, 2020

(87) PCT Pub. No.: WO2019/131826
PCT Pub. Date: Jul. 4, 2019

(65) Prior Publication Data
US 2020/0385219 A1 Dec. 10, 2020

(30) Foreign Application Priority Data
Dec. 28, 2017 (JP) .............................. JP2017-254917

(51) Int. Cl.
*B65G 47/244* (2006.01)
*B65G 13/04* (2006.01)
(Continued)

(52) U.S. Cl.
CPC ........... *B65G 47/244* (2013.01); *B65G 13/04* (2013.01); *B65G 21/14* (2013.01); *B65G 43/08* (2013.01); *B65G 23/10* (2013.01); *B65G 23/24* (2013.01)

(58) Field of Classification Search
CPC .. B65G 47/2445; B65G 47/244; B65G 15/22; B65G 21/14; B65G 23/10; B65G 43/08; B65G 23/24; B65G 23/22; B65G 13/04
(Continued)

(56) References Cited

U.S. PATENT DOCUMENTS 6,889,815 B2 *  5/2005  Kanamori ............ B65G 1/0478
                                                        198/369.4
8,567,587 B2 * 10/2013  Faist ...................... B65G 47/54
                                                        198/370.09
(Continued)

FOREIGN PATENT DOCUMENTS

CN          1749135 A    3/2006
CN        206172461 U    5/2017
(Continued)

OTHER PUBLICATIONS

International Search Report, dated Mar. 12, 2019 in International Patent Application No. PCT/JP2018/048023.
(Continued)

*Primary Examiner* — James R Bidwell
(74) *Attorney, Agent, or Firm* — Wood, Phillips, Katz, Clark & Mortimer

(57) ABSTRACT

An object of the present invention is to develop a device and a method by which cargo handling is automatically performed to eliminate overlaps among articles. When loaded with a plurality of articles M, a cargo handling device eliminates overlaps among the articles M. The cargo handling device has an article placement surface on which the articles M are placed. The cargo handling device performs a cargo handling operation that turns and/or rotates the articles M on the article placement surface to eliminate the overlaps among the articles M.

10 Claims, 21 Drawing Sheets

(51) Int. Cl.
*B65G 21/14* (2006.01)
*B65G 43/08* (2006.01)
*B65G 23/10* (2006.01)
*B65G 23/24* (2006.01)

(58) Field of Classification Search
USPC .............................. 198/443, 418.9; 271/280
See application file for complete search history.

(56) References Cited

U.S. PATENT DOCUMENTS

| | | | | |
|---|---|---|---|---|
| 9,499,341 | B2* | 11/2016 | Wilkins | ................. B65G 47/71 |
| 10,518,975 | B2* | 12/2019 | Itoh | ........................ B65G 47/46 |
| 10,853,600 | B2* | 12/2020 | Tachibana | ............ B65G 47/493 |
| 2003/0234155 | A1 | 12/2003 | Kanamori et al. | |
| 2005/0107911 | A1* | 5/2005 | Wynblatt | ............. B65G 47/244 |
| | | | | 700/223 |
| 2006/0057239 | A1 | 3/2006 | Hariki et al. | |
| 2008/0121495 | A1* | 5/2008 | Pressler | ............... B65G 47/244 |
| | | | | 198/411 |
| 2015/0375939 | A1* | 12/2015 | Garehan | ................ B65G 13/10 |
| | | | | 193/36 |
| 2018/0111767 | A1 | 4/2018 | Toh et al. | |

FOREIGN PATENT DOCUMENTS

| | | | | |
|---|---|---|---|---|
| EP | 3196154 | A1 | | 7/2017 |
| JP | 4-292321 | A | | 10/1992 |
| JP | H11199034 | A | | 7/1999 |
| JP | 3516343 | B1 | | 1/2004 |
| JP | 2004-75387 | A | | 3/2004 |
| JP | 2011-236010 | | * | 11/2011 ............. B65G 47/14 |
| JP | 2016-216222 | | * | 12/2016 ............. B65G 47/14 |
| JP | 2020-93894 | | * | 6/2020 ............. B65G 47/14 |
| WO | 2016/208736 | A1 | | 12/2016 |

OTHER PUBLICATIONS

International Preliminary Report on Patentability and Written Opinion of the International Searching Authority, dated Jun. 30, 2020 in International Patent Application No. PCT/JP2018/048023.
Supplementary European Search Report dated Jul. 22, 2021 in European Patent Application No. EP 18 89 4963.

* cited by examiner

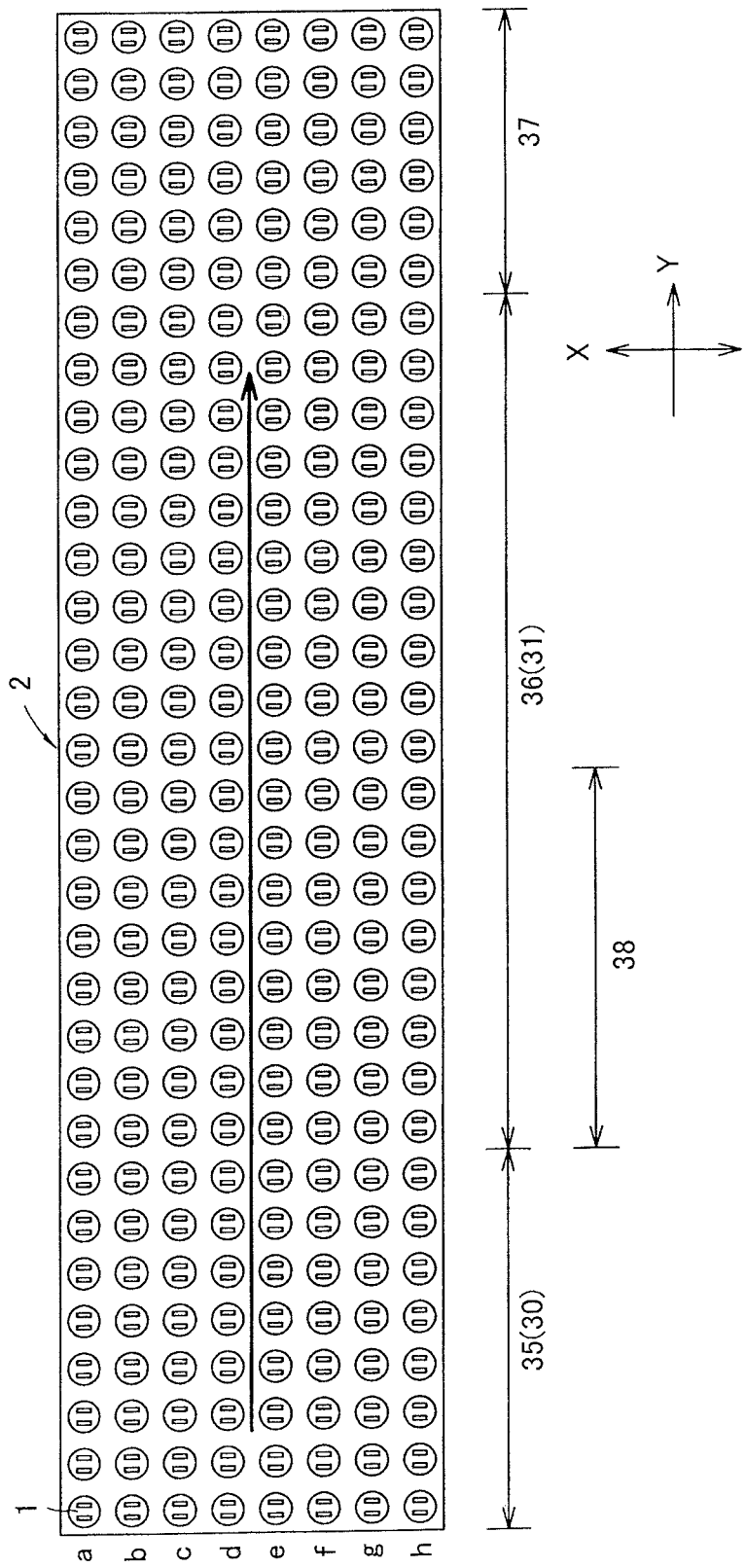
FIG. 1A
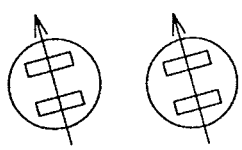
FIG. 1B
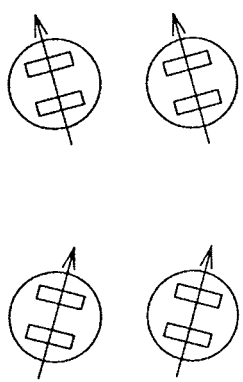
FIG. 1C   FIG. 1D
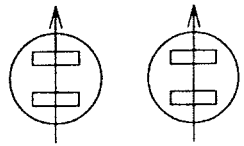

CARGO HANDLING DEVICE AND CARGO HANDLING METHOD

TECHNICAL FIELD

The present invention relates to a cargo handling device and a cargo handling method. More specifically, the present invention relates to a device and a method which eliminate vertical overlaps of articles to let them spread out into a separate articles.

BACKGROUND ART

Small articles supplied from factories or wholesalers might be individually packaged or shipped for sale.

In such a case, miscellaneous types of articles may be transported in a state of being thrown into one box at a factory or the like. Otherwise, many products of the same type may be packed and transported in one box.

At the receiving destination, the box is opened and the articles are loaded into a packaging line or the like for packaging and shipping.

Since many articles are packed in a box, if the box is simply turned inside out to load the articles into the conveyor, the articles will be conveyed downstream in a vertically overlapping state and cause a jam in many cases.

Therefore, the handling of the articles is required at the recipient.

In practice, the box is turned over on a work table or the like and the articles inside are spread on the work table. As a result, the articles are piled up on the work table. Then, the worker picks up the piled articles and places them one by one on a conveying device such as a conveyor to convey them downstream.

There is a device disclosed in Patent Document 1 as an invention related to the present invention.

PRIOR ART DOCUMENT

Patent Document

Patent Document 1: JP 3516343 B

DISCLOSURE OF INVENTION

Technical Problem

As described above, the cargo handling for eliminating the overlaps among the articles is manually performed by the worker. In the market, there is a demand for a method of automatically performing this work, but no device for achieving this is yet developed.

Therefore, it is an object of the present invention to develop a device and a method which can automatically eliminate vertical overlaps of articles.

Solution to Problem

An aspect for solving the above-mentioned issue is a cargo handling device that eliminates overlaps among a plurality of articles loaded into the cargo handling device, including an article placement surface for placing the articles, wherein the cargo handling device performs a cargo handling operation that turns and/or rotates the articles on the article placement surface to eliminate the overlaps.

According to the cargo handling device of this aspect, the upper and lower articles are separated by the centrifugal force.

In the above-mentioned aspect, desirably, the cargo handling device includes a plurality of conveying cells in a planar manner to constitute the article placement surface, wherein the conveying cells include a first conveying cell with a movement function of moving the articles and a second conveying cell with a biasing-direction changing function of changing a biasing direction.

According to this aspect, the articles can be turned or rotated.

In each of the above-mentioned aspects, desirably, the cargo handling device includes a discharge number detection unit configured to detect a number of the articles discharged from the cargo handling device, wherein the cargo handling device stops the cargo handling operation when the number of the articles detected by the discharge number detection unit reaches to a predetermined number.

In each of the above-mentioned aspects, conveying speed, rotation speed, turning speed, or turning radius of the articles is desirably changeable.

According to this aspect, it is possible to select appropriate speeds (article speed, rotation speed, or turning speed) or turning radius according to the volume, weight, slipperiness, and the like of the articles.

In each of the above-described aspects, the cargo handling device is desirably configured to perform the cargo handling operation while moving the articles in one direction.

According to this aspect, it is possible to perform the cargo handling while conveying the articles.

In each of the above-described aspects, desirably, the cargo handling device includes: a cargo handling area configured to perform the cargo handling operation; and an article alignment area located downstream of the cargo handling area, wherein the cargo handling device is configured to align the articles having undergone the cargo handling operation, on a predetermined alignment line.

According to this aspect, a group of articles can be handled and aligned.

In each of the above-described aspects, desirably, the cargo handling device includes: a cargo handling area configured to perform the cargo handling operation; and an article separation area located downstream of the cargo handling area, wherein in the article separation area the cargo handling device is configured to convey the articles at different conveying speeds in one direction to separate the articles from each other in a traveling direction.

According to this aspect, it is possible to create a clearance between the articles.

In each of the above-described aspects, desirably, the cargo handling device
includes: a cargo handling area configured to perform the
  cargo handling operation; and an article separation area
  located downstream of the cargo handling area, wherein
  in the article separation area the cargo handling device is
  configured to convey the articles in one direction with
  temporarily stopping the articles or temporarily stopping
  a conveying speed to separate the articles from each other
  in a traveling direction.

According to this aspect, it is possible to create a clearance between the articles.

In each of the above-described aspects, desirably, the cargo handling device includes: a cargo handling area configured to perform the cargo handling operation: and a swinging area located downstream of the cargo handling area, wherein in the swing area the cargo handling device changes a traveling direction of the articles little by little to convey the articles in one direction while swinging.

According to this aspect, the articles can be arranged in a line.

A cargo handling method for solving the same problem is a cargo handling method for eliminating overlaps among articles, the method including: placing articles on a predetermined placement surface; and turning and/or rotating the articles on the predetermined placement surface to eliminate the overlaps among the articles.

Effect of Invention

According to the cargo handling device and the cargo handling method of the present invention, the overlaps among articles can be automatically eliminated.

BRIEF DESCRIPTION OF DRAWINGS

FIG. 1A is a plan view of a conveying device (cargo handling device/article alignment device) according to an embodiment of the present invention, FIG. 1B shows a state in which a conveying cell is in a forward posture, FIG. 1C shows a state in which the conveying cell is in a right tilted posture, and FIG. 1D shows a state in which the conveying cell is in a left tilted posture.

FIGS. 7A and 7B are explanatory diagrams showing the action of a cargo handling area of the conveying device shown in FIG. 1, wherein FIG. 7A shows orientations of conveying rollers in the conveying cells and biasing directions of articles in the area, and FIG. 7B shows zoned blocks of the area in each of which the conveying rollers in the same biasing direction are collected.

FIGS. 8A to 8C are explanatory diagrams showing the action of the cargo handling area of the conveying device shown in FIG. 1, wherein FIG. 8A shows biasing directions in which the conveying cells are biased in the area, FIG. 8B shows the movement of articles in the cargo handling area during a cargo handling operation, and FIG. 8C shows the movement of the articles in the cargo handling area after end of the cargo handling operation.

FIGS. 21A and 21B are explanatory diagrams showing the operation of a cargo handling area of a conveying device in another embodiment, wherein FIG. 21A shows orientations of conveying rollers in the conveying cells and biasing directions of articles in the area, and FIG. 21B shows zoned blocks of the area in each of which the conveying rollers in the same biasing direction are collected.

BEST MODE FOR CARRYING OUT THE INVENTION

Hereinafter, an embodiment of the present invention will be described. FIG. 1 shows a conveying device 2 according to the embodiment of the present invention. The conveying device 2 of the present embodiment is formed such that a cargo handling device 30 and an article alignment device 31 are directly combined. The conveying device 2 conveys articles M from the upstream side to the downstream side. The front part functions as a cargo handling device, and the rear part functions as an article alignment device.

Figure 2:
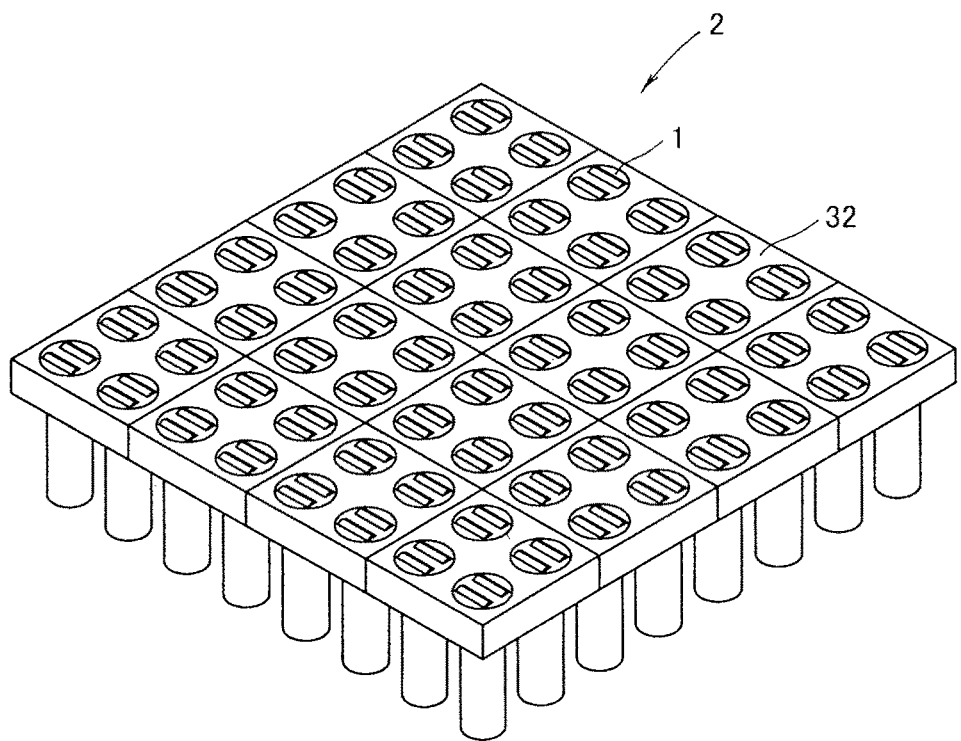
FIG. 2 is a perspective view of the conveying device shown in FIG. 1.

The conveying device 2 of the present embodiment is implemented by a device having a structure shown in FIG. 2. For convenience of drawing, FIG. 2 shows a part of the conveying device 2, and the actual conveying device 2 has a larger number of conveying cells 1 than those shown in FIG. 2.

Figure 3:
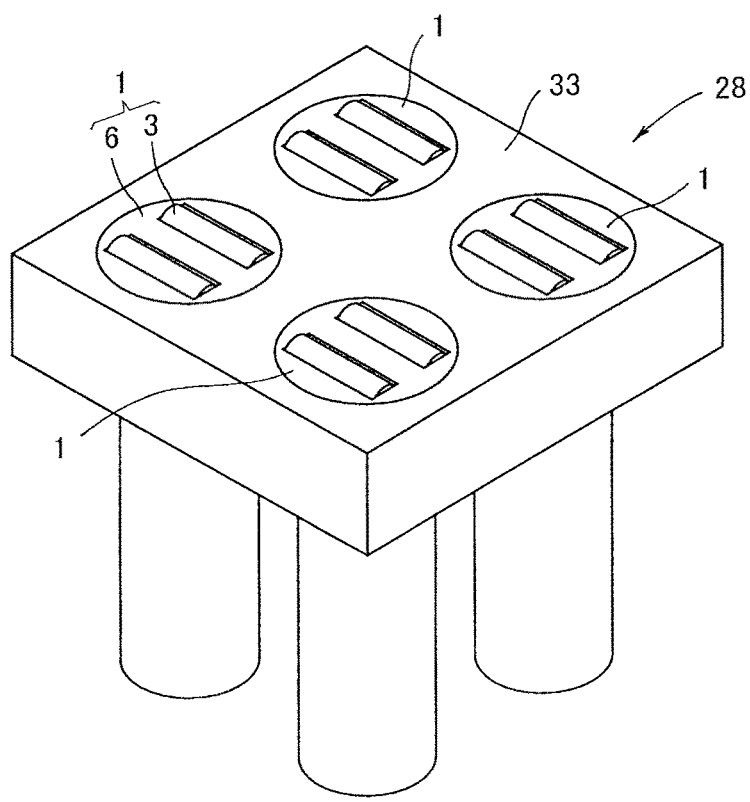
FIG. 3 is a perspective view of a conveying cell unit.
Figure 4:
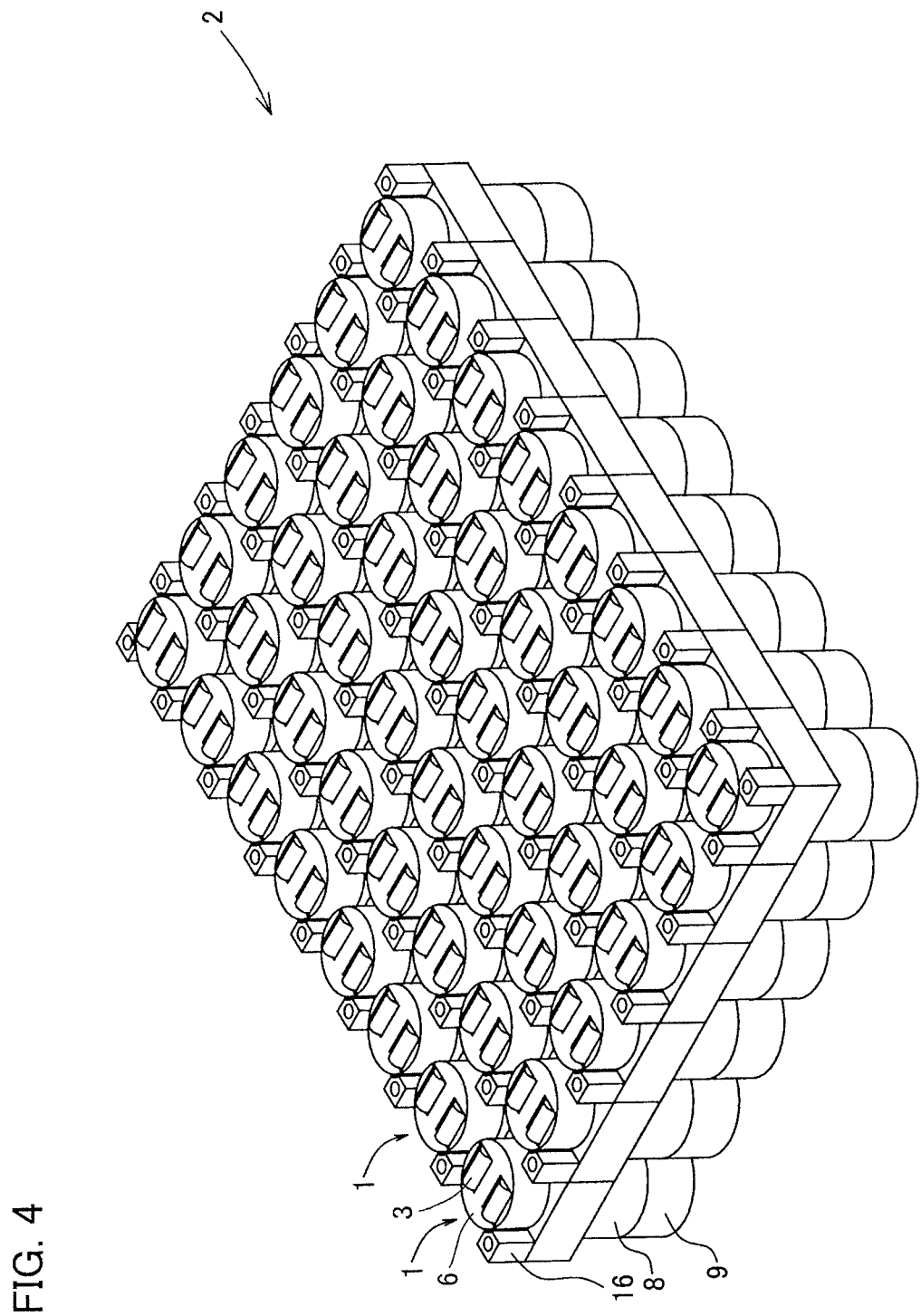
FIG. 4 is a perspective view of the conveying device shown in FIG. 2 but removing surface plates of conveying cell units.

The conveying device 2 has an article placement surface 32 on which the articles M are to be placed. The article placement surface 32 is formed by arranging a large number of conveying cells 1 in a planar manner as shown in FIG. 3. That is, a large number of conveying cells 1 are laid out in a planar manner to form the conveying device 2 having the article placement surface 32.

As will be described later, the conveying cells 1 each have conveying rollers 3 and a turning table 6 that turns the conveying rollers 3. The conveying cell 1 functions as a biasing unit that biases the articles M. The conveying cells 1 as the biasing units each have conveying rollers 3 that move the articles M in contact with the bottoms of the articles M, and can change the orientation of the conveying rollers 3 by the turning table 6 thereby to change the biasing direction of the articles M.

In the conveying cell 1, the conveying rollers 3 perform a movement function of biasing and moving the articles M, and the turning table 6 performs a biasing direction changing function.

In the present embodiment, as shown in FIG. 3, four conveying cells 1 are combined into a unit by a single surface plate 33. Then, conveying cell units 28 are laid out in a planar manner to form the conveying device 2.

In each of the conveying cell units 28, the front end of the turning table 6 of each conveying cell 1 and portions of the conveying rollers 3 are exposed from the surface plate 33. When the bottoms of the articles M come into contact with the conveying rollers 3, the conveying rollers 3 rotate and the articles M receives a biasing force from the conveying rollers 3. Further, the conveying cells 1 each can change the biasing direction of the articles M by rotating the turning table 6 by a turning motor 8.

Figure 5:
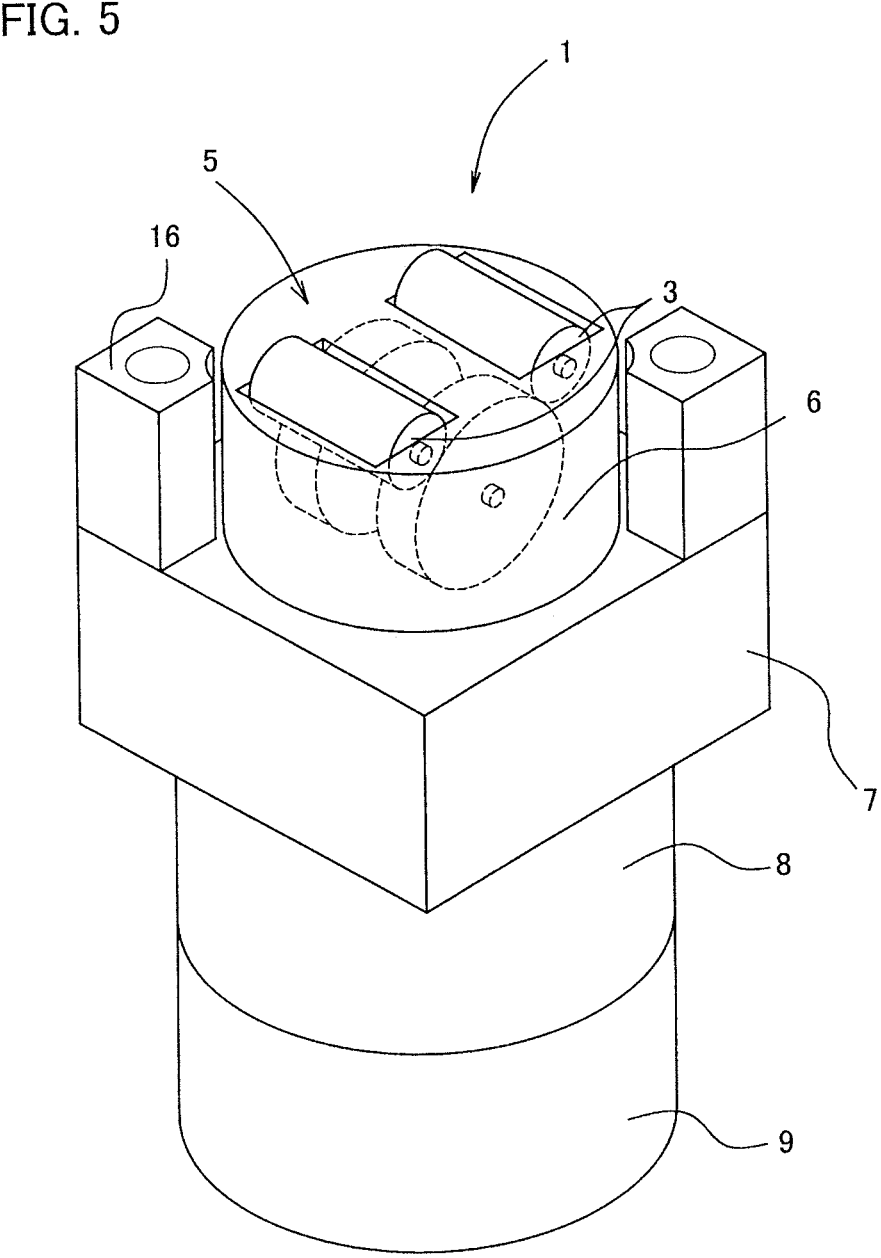
FIG. 5 is a perspective view of the conveying cell.

The appearance of the conveying cell 1 is as shown in FIG. 5.

The conveying cell 1 has the movement function of biasing and moving the articles M by the conveying rollers 3. The conveying cell 1 includes a biasing direction changing unit that changes the biasing direction of the articles M. Specifically, the conveying cell 1 has the conveying rollers 3 on which the articles M are to be placed. The conveying rollers 3 are rotated by a traveling motor 9, and the bottoms of the articles M on the conveying rollers 3 are biased by the rotation of the conveying rollers 3 to move the articles M.

Further, the conveying cell 1 has the turning table 6 that can change the orientation of the conveying rollers 3 and change the biasing direction of the articles M.

As shown in FIG. 5, the conveying cell 1 has, in order from the top, a traveling unit 5, the turning table 6, a housing 7, the turning motor 8, the traveling motor 9, and the like.

The housing 7 is fixed to a fixing structure (not shown) in the conveying device 2.

The turning motor 8 is fixed to the housing 7. The traveling motor 9 is fixed under the turning motor 8.

The traveling unit 5 is mounted on the turning table 6. The turning table 6 is mounted to the turning motor 8 in a manner capable of being rotationally driven.

Figure 6:
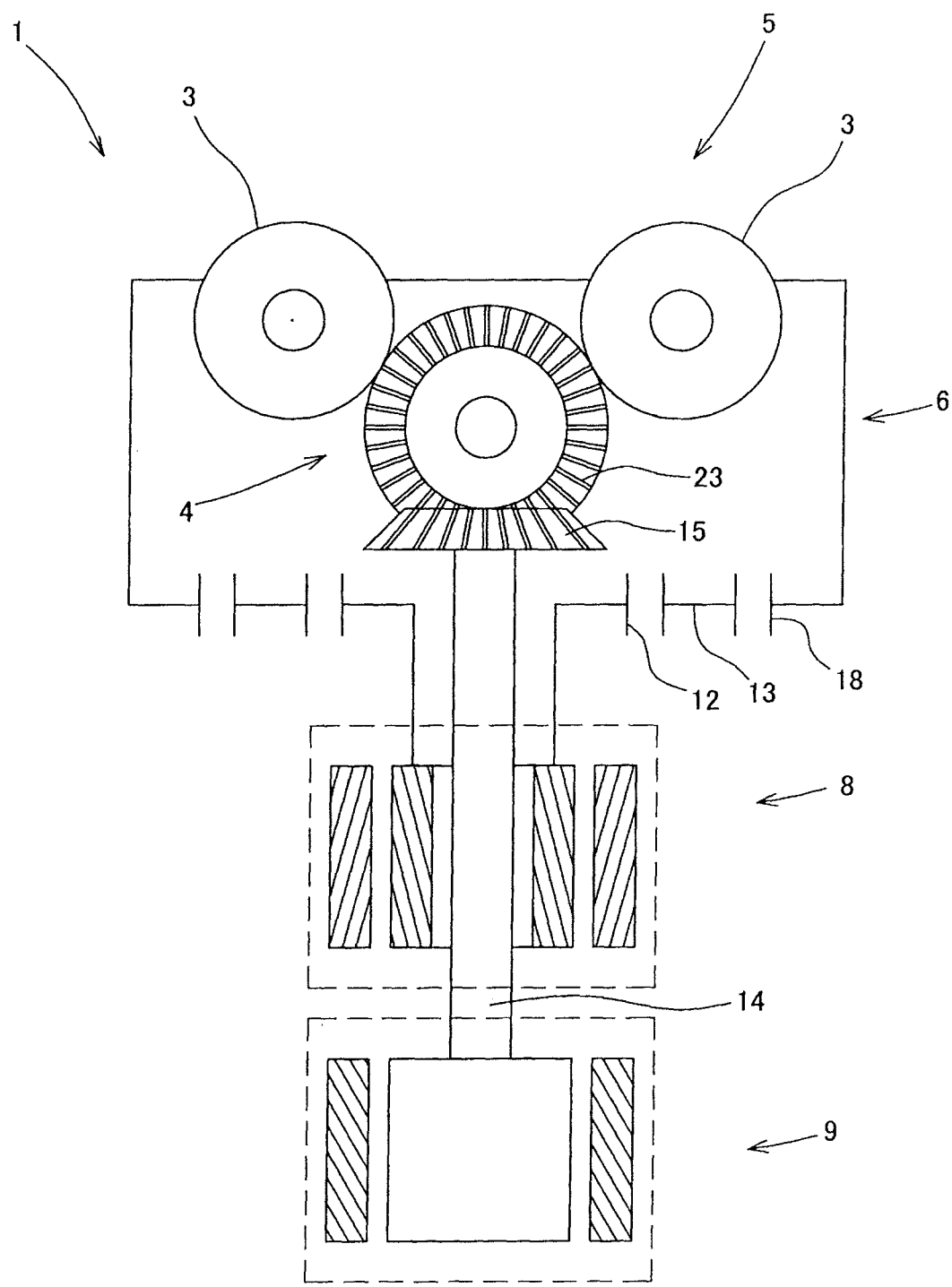
FIG. 6 is a skeleton diagram showing a power system of the conveying cell.

As shown in FIGS. 5 and 6, the traveling unit 5 has the two conveying rollers 3 (rotors). The two conveying rollers 3 are rotatably supported by the turning table 6. The conveying rollers 3 are engaged with a drive roller 4.

The drive roller 4 is rotated by power transmission from a drive shaft 14 of the traveling motor 9 via a bevel gear part 15 and a bevel gear part 23. The conveying rollers 3 are rotated by the rotation of the drive roller 4.

That is, the conveying rollers 3 of the traveling unit 5 are rotated by power transmission from the traveling motor 9.

The turning table 6 is a cylindrical member that has an internal gear 18 therein. The turning table 6 is subject to rotational force transmitted from the turning motor 8 via a gear 12, a gear 13, and the internal gear 18. Therefore, the turning table 6 is rotated by the turning motor 8.

As described above, the traveling unit 5 is attached to the turning table 6. Therefore, when the turning table 6 rotates, the orientation of the traveling unit 5 changes, and the biasing direction for biasing the articles M changes accordingly.

In this way, in the conveying cell 1, the rotational force of the traveling motor 9 is transmitted to the conveying rollers 3, and the conveying rollers 3 are rotated to bias the articles M on the conveying rollers 3 to move the articles M.

The turning table 6 is rotated by driving the turning motor 8, and the orientation of the conveying rollers 3 is changed, so that the biasing direction of the articles M can be arbitrarily changed.

In this way, the conveying cell 1 has the movement function of moving the articles M and the biasing direction changing function of changing the biasing direction.

The conveying device 2 also has the article placement surface 32 constituted by the surface plates 33 of the conveying cell units and the front ends of the turning tables 6 of the conveying cells 1. The conveying rollers 3 of the conveying cells 1 are exposed on the article placement surface 32, Therefore, the articles M on the article placement surface 32 can be moved by rotating the conveying rollers 3, and the biasing direction of the articles M can be arbitrarily changed by rotating the turning table 6.

In addition, the conveying cell 1 is provided with load presence sensors 16. The load presence sensors 16 each have a function of detecting the presence or passage of the articles M. Further, the conveying cell 1 has an intercommunication unit (not shown), and transmits signals of the load presence sensors 16 and the driving status of the traveling motor to the adjacent conveying cells 1.

In the present embodiment, the conveying cells 1 constituting the conveying device 2 can operate in an intermittent operation mode. In the intermittent operation mode, the conveying rollers 3 of the own conveying cell 1 start and stop according to the placement state of the articles M and the driving state of the surrounding conveying cells 1.

In the intermittent operation mode, when there is an article M on the own conveying cell 1 and there is no article M on the conveying cell 1 in front as seen in the traveling direction, the traveling motor 9 of the own conveying cell 1 is driven to move the article M on the own conveying cell 1. When the conveying cell 1 in the front as seen in the traveling direction is in a state of conveying the article M and the conveying cell 1 in front as seen in the traveling direction does not move, the own conveying cell 1 stops. When the conveying cell in front as seen in the traveling direction moves, the own conveying cell 1 is driven to move the article M on the own conveying cell 1.

In the present embodiment, the conveying cells 1 constituting the conveying device 2 can also operate in a continuous operation mode. In the continuous operation mode, the conveying rollers 3 are driven regardless of the placement state of the articles M and the like.

The conveying device 2 of the present embodiment is formed by laying out a large number of the conveying cells 1 described above. In the present embodiment, eight conveying cells 1 are installed in a width direction, and a larger number of conveying cells 1 are arranged in a longitudinal direction.

The conveying device 2 of the present embodiment has a cargo handling area 35 that functions as the cargo handling device 30, an article alignment area 36 that functions as the article alignment device 31, and a carry-out area 37 ahead of these areas, which are arranged along the longitudinal direction.

The article alignment area 36 is also a swing area.

A part of the article alignment area also functions as an article separation area 38.

The operations and functions of these areas will be described below.

In the conveying device 2, the articles M generally advance from the cargo handling area 35 toward the carry-out area 37, as shown by a large arrow in FIG. 1A. For convenience of description, the direction (shown by the large arrow in FIG. 1A) of advancing straight from the cargo handling area 35 to the carry-out area 37 on the center line of the conveying device 2 will be called a main traveling direction or Y direction. The direction orthogonal to this direction will be called X direction.

In the drawings, the small arrows in the conveying cells 1 indicate the directions in which the articles M is biased. The directions in which the article M is biased are the directions perpendicular to the conveying rollers 3.

As shown in FIG. 1B, we define the poster where a rotation axis of the conveying roller 3 is oriented in the direction perpendicular to the main traveling direction and the direction of the articles M biased by the rotation of the conveying roller 3 is the forward direction with respect to the main traveling direction, as forward posture.

On the other hand, as shown in FIGS. 1C and 1D, we define the posture where the rotation axis of the conveying roller 3 is tilted with respect to the main traveling direction and the direction of the articles M biased by the rotation of the conveying roller 3 is the direction slanted to the main traveling direction, as tilted posture. Further, as shown in FIG. 1C, we define the posture where the biasing direction (small arrow) of the conveying roller 3 is tilted to the right with respect to the main traveling direction, as right tilted posture, and as shown in FIG. 1D, the posture where the biasing direction (small arrow) is tilted to the left with respect to the main traveling direction, as left tilted posture.

[Cargo Handling Area]

The cargo handling device 30 is arranged in the cargo handling area 35. The cargo handling device 30 in the cargo handling area 35 is an area that performs the function of handling the piled-up articles M to eliminate overlaps among the articles M and separate the articles M from one another. That is, in the cargo handling area 35, the cargo handling device 30 performs the cargo handling operation.

The posture and the biasing direction of the conveying rollers 3 in the conveying cells 1 at the performance of the cargo handling operation are as shown in FIG. 7.

Figure 7A:
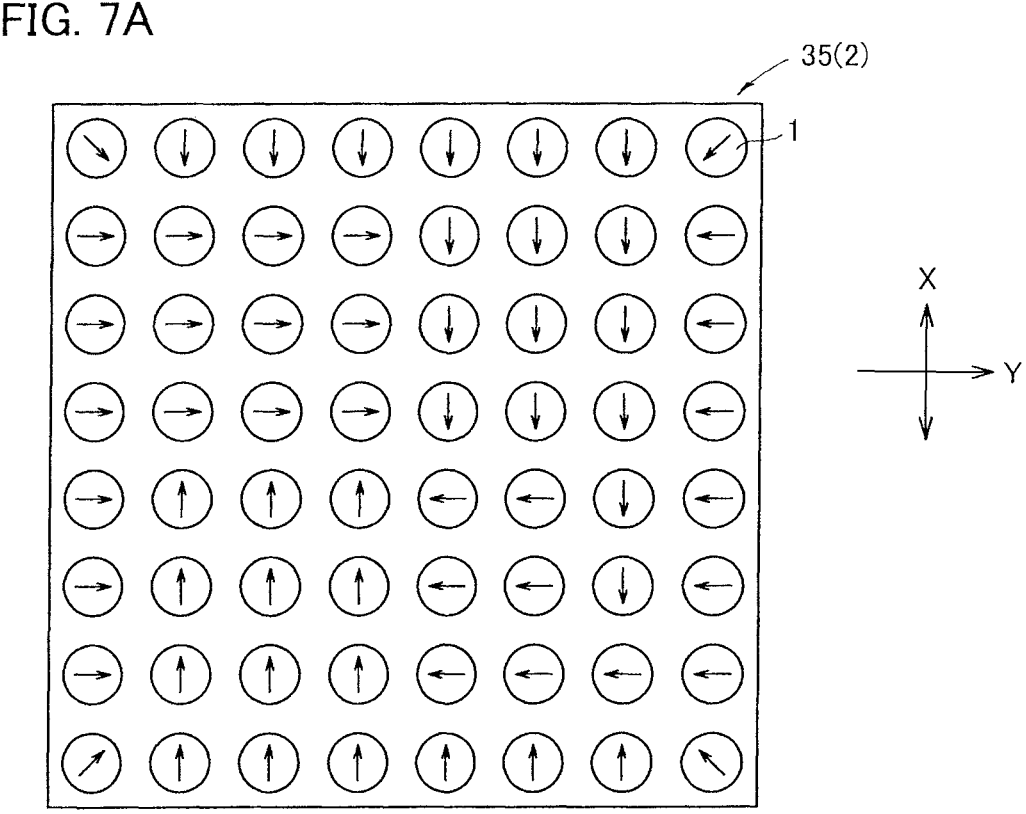

As shown in FIG. 7A, the conveying rollers 3 in the conveying cells 1 are postured to bias the articles M such that the articles turn around the center of the cargo handling area 35. The conveying rollers 3 of the conveying cells 1 on the outermost circumference are postured to bias the articles M in a direction toward the center of the cargo handling area 35.

Figure 7B:
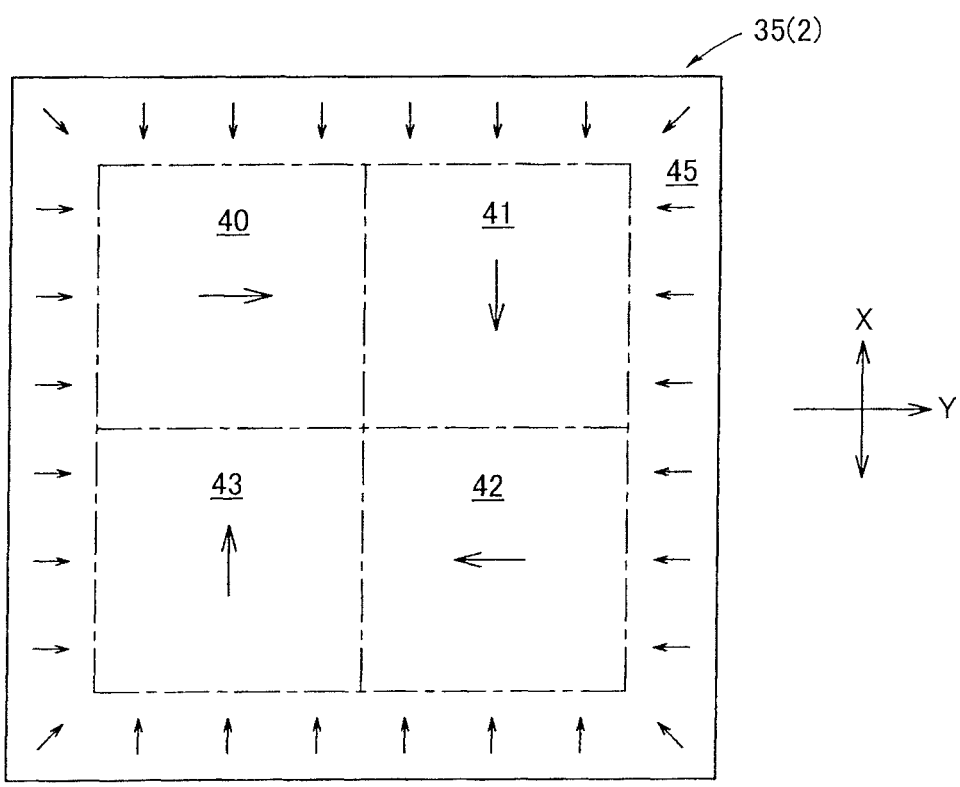

The cargo handling area 35 is divided into blocks according to the postures (biasing directions) of the conveying cells 1 as shown in FIG. 7B.

The central part of the cargo handling area 35 is divided into four blocks 40, 41, 42, and 43 in terms of operation as shown in FIG. 7B. The central four blocks 40, 41, 42, and 43 are different in biasing direction by 90 degrees as shown by arrows in FIG. 7B.

Specifically, the biasing direction of the conveying cells 1 in the block 40 is the positive Y direction, the biasing direction in the block 41 is in the X direction (downward in the drawing), the biasing direction in the block 42 is in the negative Y direction, and the biasing direction in the block 41 is in the X direction (upward in the drawing).

Therefore, the articles M placed in the central part move and turn in order in the four blocks 40, 41, 42, and 43. In the present embodiment, the four blocks 40, 41, 42, 43 in the central part constitute the turning zone.

There is a centering area 45 around the turning area. In the centering area 45, the conveying rollers 3 in the conveying cell 1 is postured to bias the articles M in the direction toward the center of the cargo handling area 35, and prevents the articles M from jumping out of the cargo handling area 35.

Figure 8A:
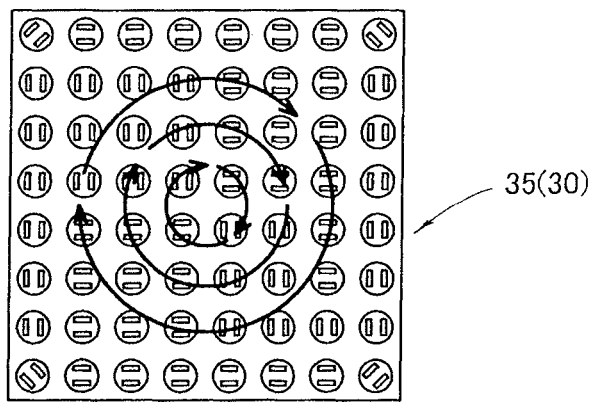

As shown in FIG. 8A, the direction in which the conveying cells 1 move the articles M (small arrows) draws multiple circles as a whole. In the present embodiment, the postures of the conveying rollers 3 in the conveying cells 1 are determined such that the articles M turn around a point in the cargo handling area 35.

In the present embodiment, the cell group in the cargo handling area 35 is a combination of cells for biasing the articles M in the X direction and the Y direction. The conveying rollers 3 in the conveying cells 1 may turn the articles M around in a tilted posture.

During the cargo handling operation, the conveying cells 1 operate in the continuous operation mode so that the conveying rollers 3 are constantly driven regardless of the placement state of the articles M and the like.

Figure 8B:
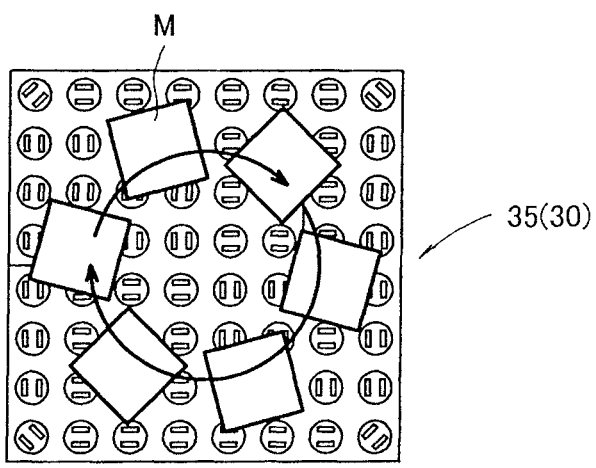

The articles M loaded into the cargo handling area 35 turn around one point as shown in FIG. 8B. The article M located at the center will rotate in place.

The articles M are randomly loaded into the cargo handling area 35. In the initial stage of loading, most of the articles M overlap in the height direction. However, the overlapping articles M in the cargo handling area 35 collapse while turning or rotating, and are arranged in a planar manner.

There are several possible reasons why such a phenomenon occurs.

One is that the centrifugal forces exerted on the vertically overlapping articles M are different.

Figure 9A:
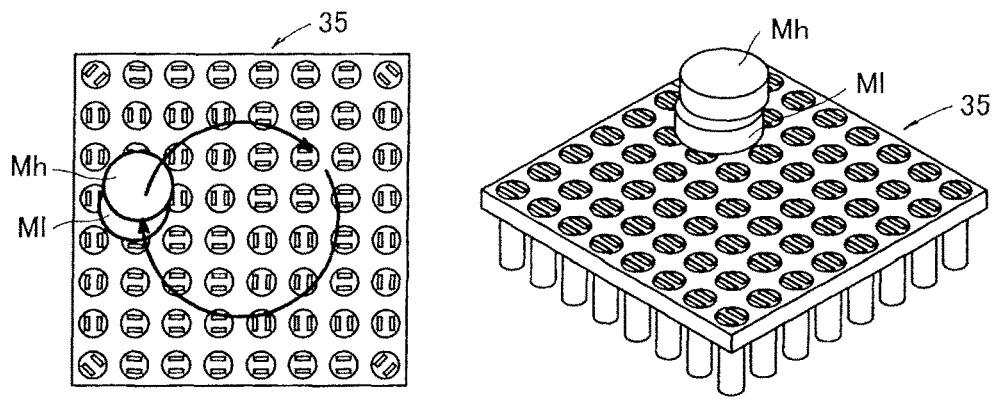
FIGS. 9A to 9C are explanatory diagrams showing behavior of articles and the degree of an overlap between articles in the cargo handling area.
Figure 9B:
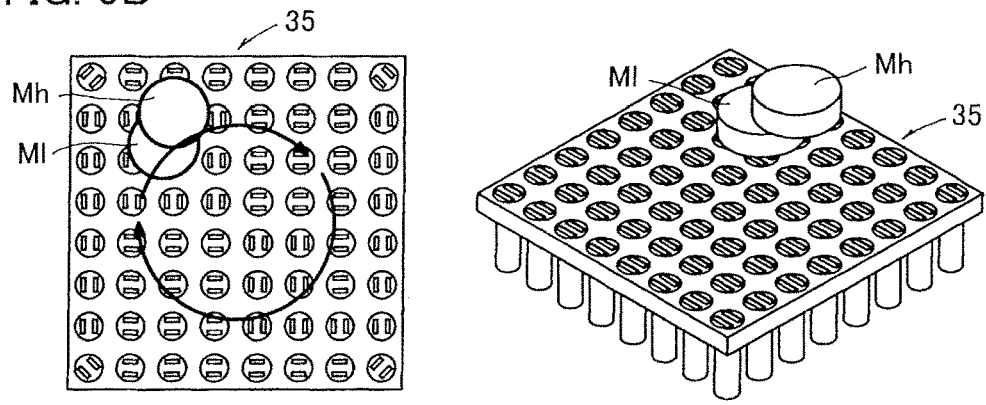
Figure 9C:
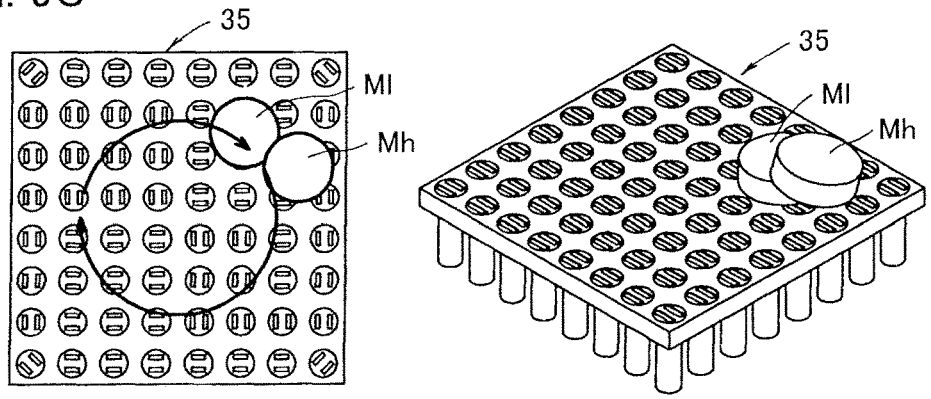
Figure 9D:
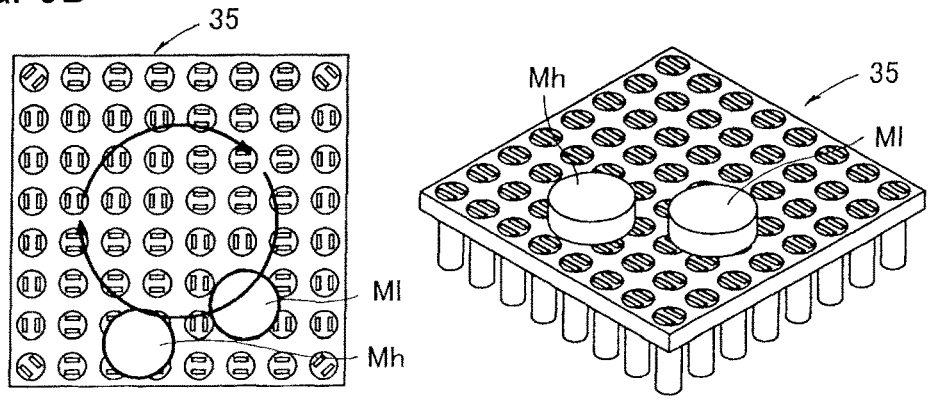

Specifically, in the initial stage of rotation, two articles Mh and Ml, for example, vertically overlap as shown in FIG. 9A. However, the centers of gravity of the two are slightly offset.

When rotated in this state, one of the upper and lower articles M is located outside the center of turning. Here, the centrifugal forces applied to the articles Mh and Ml are proportional to the distances from the center of rotation. Therefore, the article Mh located outside the center of turning receives a stronger centrifugal force than the other article Ml. This causes the outer article Mh to move relative to the inner article Ml, whereby the overlap collapses.

Another reason is the difference in frictional force. Specifically, the articles Mh and Ml receive centrifugal forces due to turning and rotation and almost start to move outward. Here, the lower article Ml is in contact with the article placement surface 32. On the other hand, the upper article Mh is in contact with the lower article Ml.

Therefore, even if the centrifugal forces exerted on the articles Mh and Ml are the same, the frictional forces for preventing the movement of the articles are different. Therefore, the outer article Mh moves relative to the inner article Ml, whereby the overlap collapses.

For any reason, as a practical matter, the outer article Mh moves relative to the inner article Ml, the overlap collapses, and these articles are individually handled.

Figure 8C:
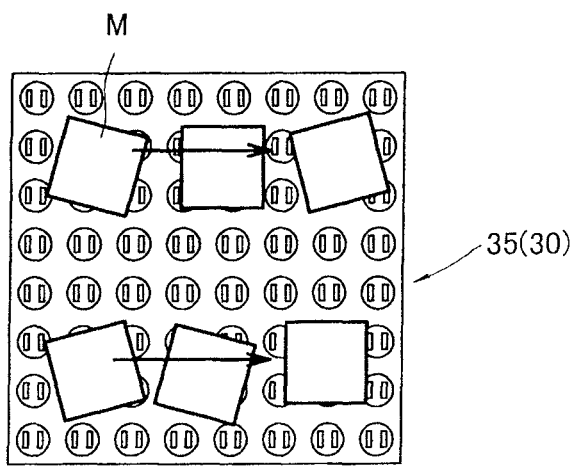

In the cargo handling area 35, the articles M are turned or rotated for a certain period of time to eliminate the overlap between the articles Mh and Ml. When the certain period of time has elapsed, the turning table 6 rotates to change the conveying rollers 3 to the forward posture as shown in FIG. 8C. As a result, the articles M are carried out to the article alignment area 36 on the downstream side.

Figure 20A:
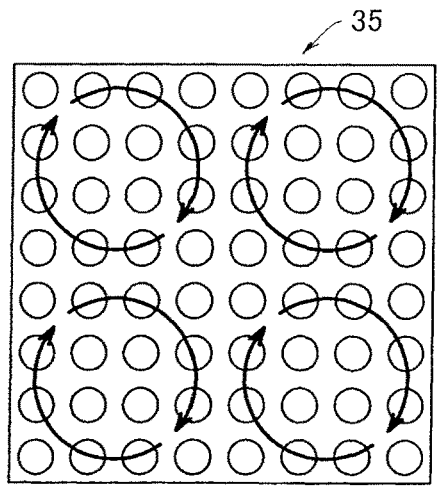
FIGS. 20A to 20C are explanatory diagrams showing another operation example of the cargo handling area.
Figure 20B:
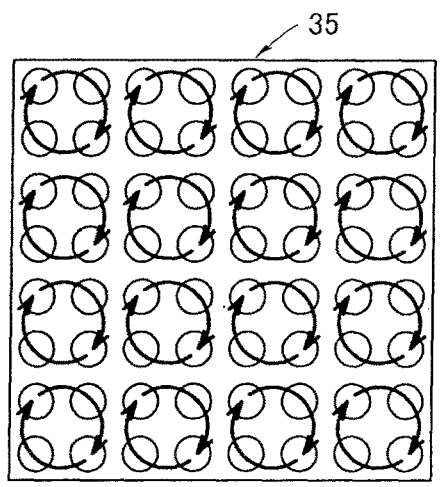

In the present embodiment, during the cargo handling operation, the angle of the turning table 6 is determined so that the articles M turn about a point in the cargo handling area 35, and the posture of the conveying rollers 3 are set to a predetermined posture. Alternatively, the conveying rollers 3 may be rotated around a plurality of points as shown in FIG. 20A. Still alternatively, the articles M may be rotated in place as shown in FIG. 20B.

Figure 20C:
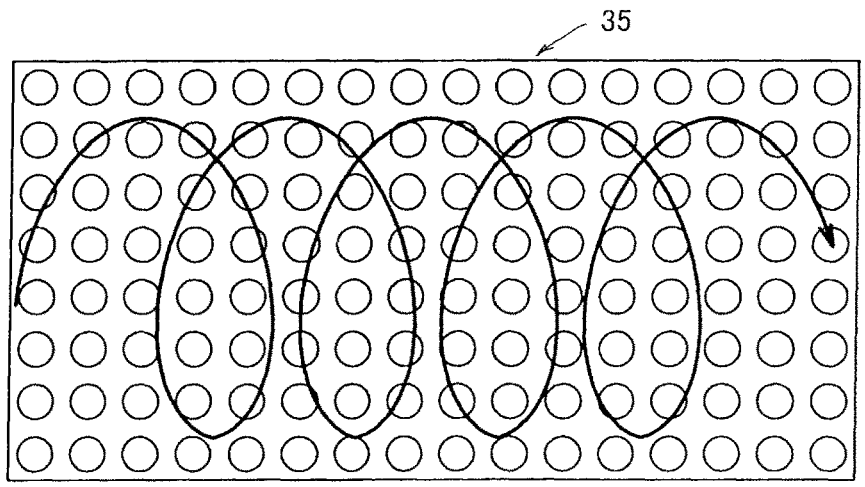

Otherwise, the center of turning may be shifted so that the articles M turn in a spiral shape as shown in FIG. 20C. According to this measure, the articles M will be subjected to the cargo handling operation while being advanced to b.

The speed, rotation speed, turning speed, turning radius, and the like of the articles M during the cargo handling operation are desirably changed according to the properties and quantity of the articles M. The appropriate speed, rotation speed, turning speed, turning radius, and the like of the articles M are determined in advance by preliminary experiments and selected according to the type and quantity of the articles M loaded in the cargo handling area 35.

The speed, and the like of the articles M may be changed during the cargo handling operation. For example, when a large number of articles M are loaded, the conveying rollers 3 are first rotated at a high speed to roughly collapse the pile of the article M, and then the rotation speed of the conveying rollers 3 is reduced to eliminate the overlap between the articles Mh and Ml.

Alternatively, at the early stage of loading of the articles M, the articles M are rotated with a small turning radius to collapse the pile of the articles M in the cargo handling area 35 and let the articles M spread out, and then the turning radius is expanded to eliminate the overlaps among the articles M scattered around.

Otherwise, the speed, the rotation speed, the turning speed, the turning radius, and the like of the articles M may be changed periodically during the cargo handling operation to shake the article group.

The rotation speed of the conveying rollers 3 of the conveying cells 1 does not need to be constant and may be different depending on the location. In the above-described embodiment, the cargo handling operation is performed for a certain limited period of time. Alternatively, it may be determined whether the overlaps among the articles M are eliminated by image analysis or the like so that the cargo handling operation can be stopped after the overlaps are eliminated.

Figure 21A:
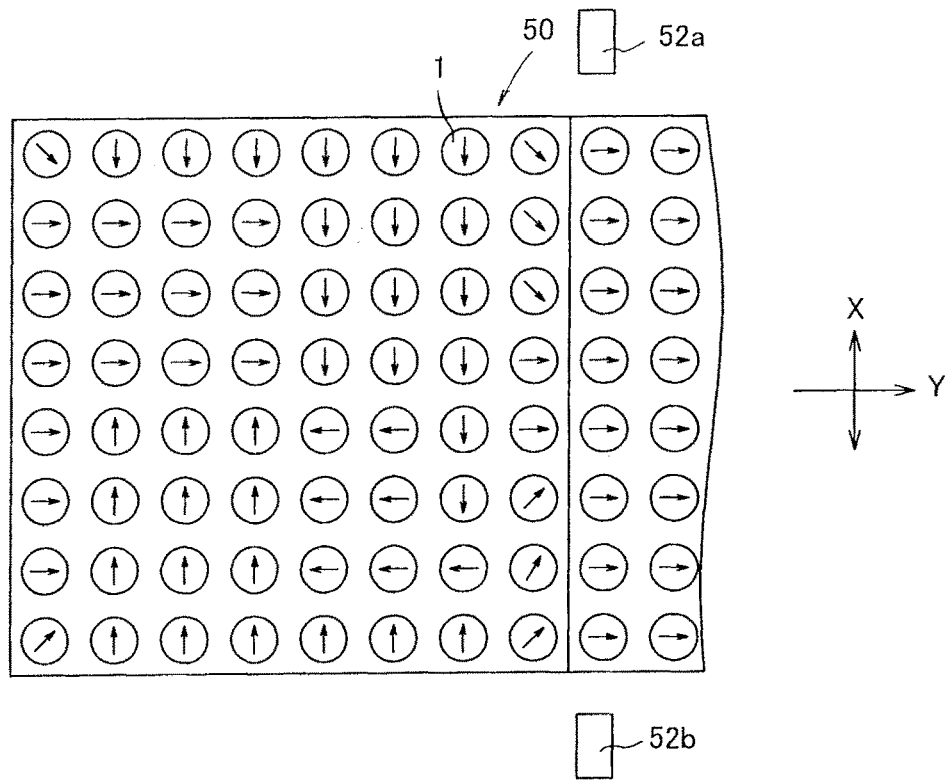
Figure 21B:
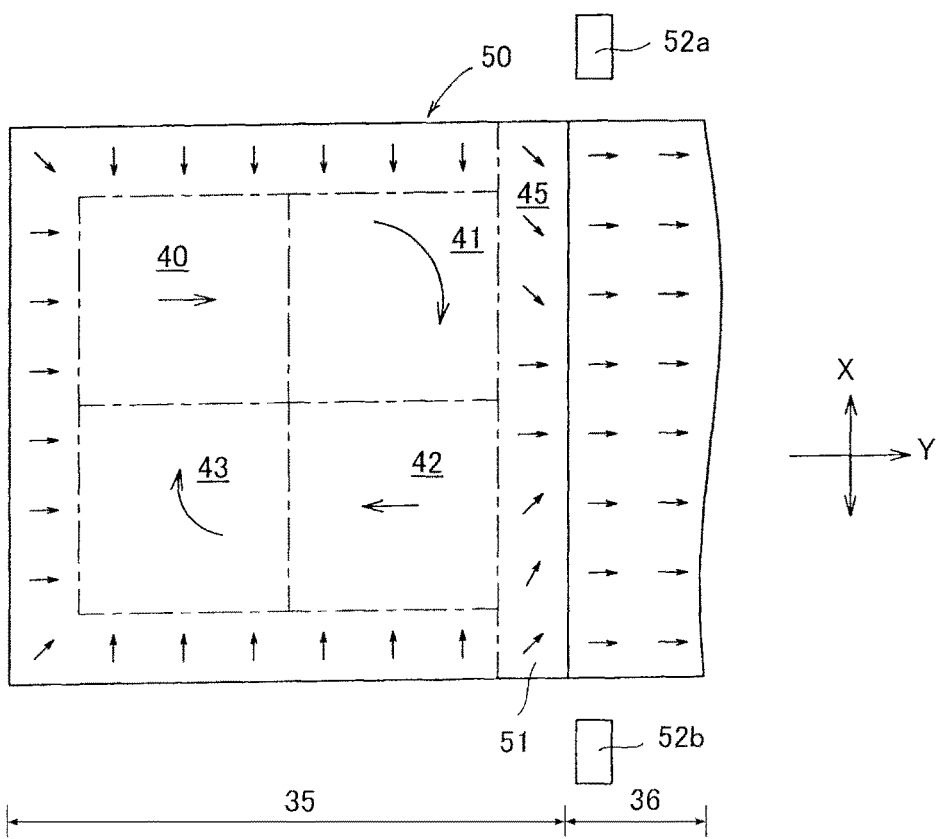

As another measure, the number of articles jumping out of the cargo handling area by the centrifugal force may be detected, and the cargo handling operation may be stopped when the number has reached a certain number, FIG. 21 shows a conveying device 50 that employs this configuration.

In the conveying device 50 shown in FIG. 21, a zone 51 adjacent to the article alignment area 36 faces toward the article alignment area 36 with a slight tilt.

That is, the conveying device 50 shown in FIG. 21 also has a turning area in the center and a centering area 45 around the turning area. However, three sides that surround the turning area function as the centering area 45. The zone 51 of the centering area 45 adjacent to the article alignment area 36 has the biasing directions of the conveying rollers 3 oriented to the article alignment area 36 side.

The rotation speed of the conveying rollers 3 in the turning area is not uniform, and the rotation speed of the conveying rollers 3 is fast in the zone that is near the article alignment area 36 and is oriented to the article alignment area 36.

For example, if the central part is divided into four blocks 40, 41, 42, and 43, the speed of the block 41 is higher than that of the opposing block 43.

In the present embodiment, a discharge number detection unit 52 is provided near the boundary between the cargo handling area 35 and the article alignment area 36. The discharge number detection unit 52 is a light-transmissive photoelectric sensor that has a pair of light projecting units 52*a* and a light receiving unit 52*b*. When the article M passes between the light projecting unit 52*a* and the light receiving unit 52*b*, the light from the light projecting unit 52*a* is momentarily blocked so that it is detected that the article M has moved from the cargo handling area 35 to the article alignment area 36.

In the present embodiment, the discharge number detection unit 52 detects the number of the articles M discharged from the cargo handling area 35.

In the present embodiment, for example, N articles M are carried into the cargo handling area 35. In the cargo handling area 35, the articles M make a turning motion to eliminate the overlaps among them. In the present embodiment, since the rotation speed of the conveying rollers 3 is high in the zone oriented to the article alignment area 36, the articles M receive a stronger centrifugal force on the discharge side of the cargo handling area 35. Thus, the articles M are swung by the centrifugal force to jump out of the cargo handling area 35.

If the discharge number detection unit 52 determines that the same number of articles M as the loaded number N have jumped out of the cargo handling area 35, it is not necessary to continue the cargo handling operation any more.

Further, when the number of articles M that is smaller by one than the loaded number is discharged, it is clear that the remaining one does not overlap, and therefore it is not necessary to continue the cargo handling operation any more.

Practically, when the articles M have been discharged at a certain percentage of the loaded number, it may be determined that the overlaps among all the articles M have been eliminated, and the cargo handling operation is desirably stopped at that stage.

Alternatively, the plurality of articles M in the overlapping state is recognized as one article, and the apparent number of articles M in the cargo handling area 35 is detected from an image captured by a camera or the like. When the apparent number has reached a predetermined number, the cargo handling operation may be stopped. Still alternatively, the cargo handling operation may be stopped in consideration of the apparent number in the cargo handling area 35 and the number detected by the discharge number detection unit 52.

The discharge number detection unit 52 is not limited to the light-transmissive photoelectric sensor, but may be one using image analysis or one using the load presence sensors 16 of the conveying cell 1.

In the embodiment described above, after the cargo handling operation is stopped, the conveying rollers 3 in the cargo handling area 35 are changed to the forward posture to carry out the articles M into the article alignment area 36 on the downstream side as shown in FIG. 8C. Alternatively, the articles M may be sent to the downstream side while changing the biasing direction like in the article alignment area 36 described later.

Specifically, the first half of the conveying device 2 may be provided with the function of the article alignment area 36 described later so that a part of the conveying device 2 is turned to eliminate the overlaps among the articles M.

[Article Alignment Area]

The article alignment device 31 is arranged in the article alignment area 36. The article alignment area 36 is an area that exhibits the function of linearly arranging the articles M in the main traveling direction (Y direction). The article alignment area 36 can also be said to be a swing area that has the function of changing the traveling direction of the articles M little by little so that the articles M are conveyed in a predetermined direction (Y direction) while being swung.

An alignment operation is performed in the article alignment area 36. In the present embodiment, the articles M are arranged in two rows along the main traveling direction.

Figure 11A:
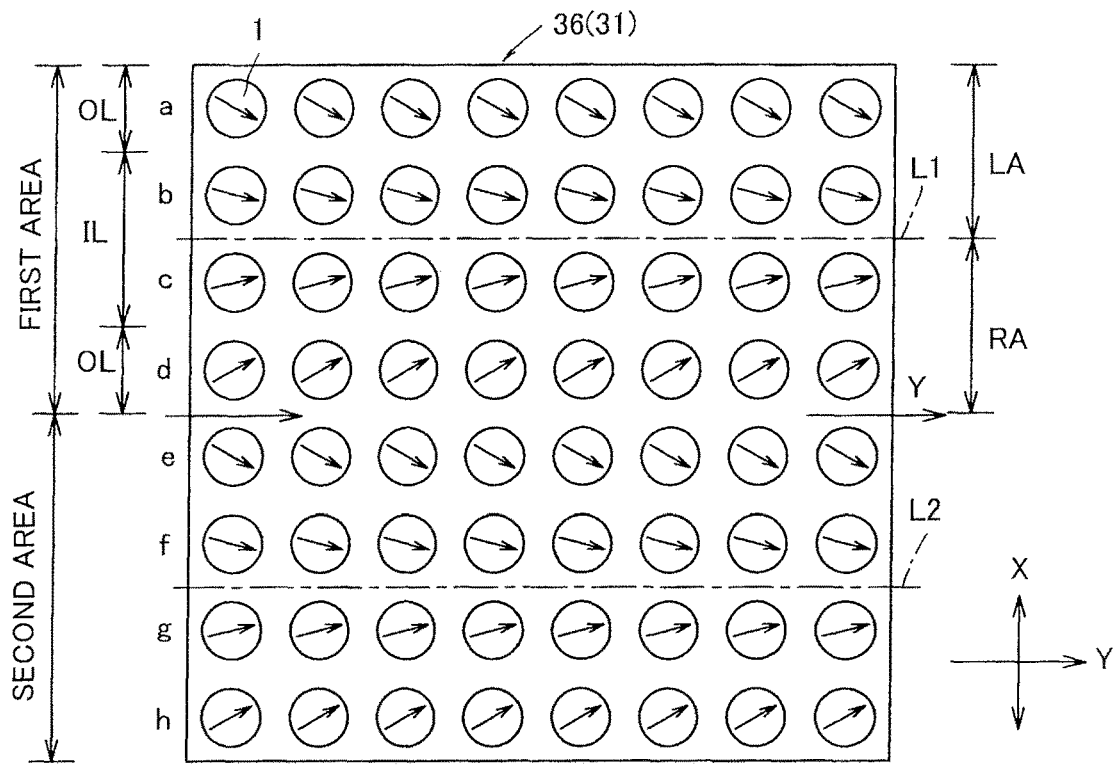
FIGS. 11A and 11B are explanatory diagrams describing the action of the conveying cell in the article alignment area.

In the present embodiment, eight conveying cells 1 are installed in the width direction, and thus there are eight lines of conveying cells 1. The lines of the article M along the traveling direction will be called a to h lines as shown in FIG. 11A. In the present embodiment, a first alignment line L1 is set between the lines b and c, and a second alignment line L2 is set between the lines f and g. In each of the drawings, the first alignment line L1 and the second alignment line L2 are indicated by alternate long and short dash lines. In each of the drawings, the articles M generally advance from the left side to the right side. The traveling direction (main traveling direction) of the articles M is the Y direction, which is indicated by an arrow in each of the drawings.

Both the first alignment line L1 and the second alignment line L2 extend in the direction along the main traveling direction (Y direction).

The first alignment line L1 and the second alignment line L2 are both in the middle of the conveying device 2. The conveying cells 1 (biasing units) 1 are distributed across the first alignment line L1 and the second alignment line L2.

In the present embodiment, as shown in FIG. 11A, the article alignment area 36 is substantially divided into a first area and a second area between the lines d and e.

The first area includes a group of four conveying cells a, b, c, and d, and the articles M are arranged on the first alignment line L1 between the lines b and c. The second area includes a group of four conveying cells e, f, g, and h, and the articles M are arranged on the second alignment line L2 between the lines f and g.

The groups of conveying cells 1 included in the first area and the second area perform the same operation. Thus, the operation of the group of conveying cells 1 in the first area will be mainly described.

As described above, in the first area, the articles M are arranged on the first alignment line L1 between the lines b and c. As shown in FIG. 11A, the lines on both sides (lines b and c) across the first alignment line L1 will be called inner lines IL, and the outer two lines (lines a and d) will be called outer lines OL. In the first area, the zone on the left side of the first alignment line L1 (lines a and b) will be called left area LA, and the zone on the right side of the first alignment line L1 (lines c and d) will be called right area RA.

Figure 11B:
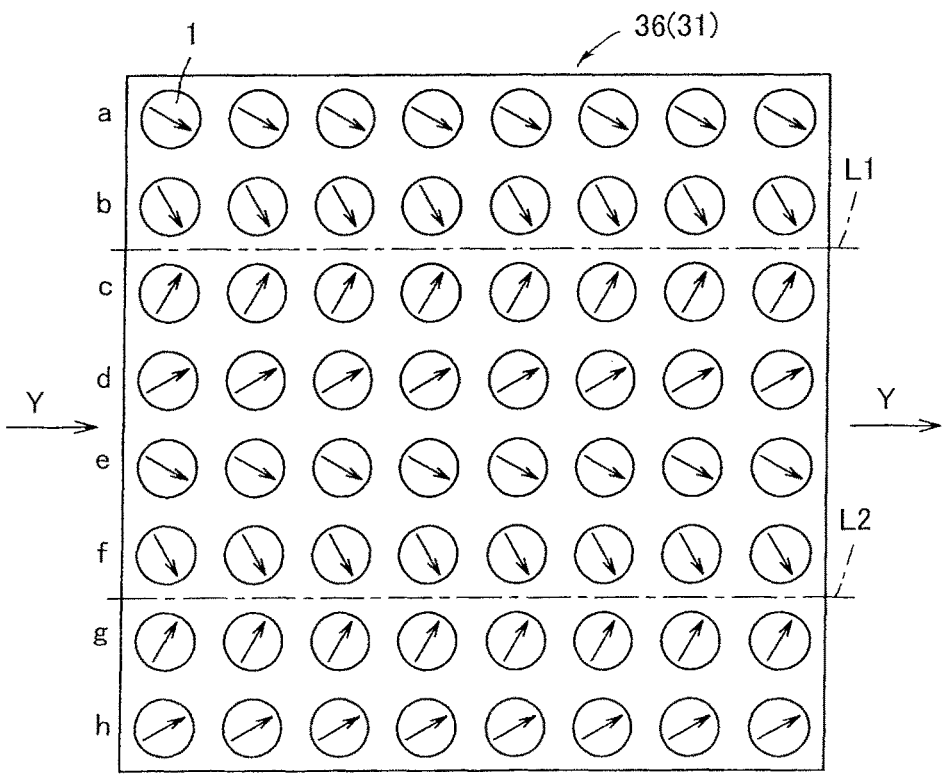

In the lines a and d belonging to the outer lines OL, the turning tables 6 are in a tilted posture, and the biasing directions (small arrows) of the conveying rollers 3 are tilted with respect to the main alignment direction and toward the first alignment line L1 as shown in FIGS. 11A and 11B. That is, the biasing directions of the conveying roller 3 (small arrow) include a vector component in the direction along the first alignment line L1 (Y direction vector) and a vector component in the direction toward the first alignment line L1 (X direction vector). That is, the biasing directions of the conveying roller 3 include a vector component in a direction along the conveying direction (Y-direction vector) and also include a vector component in a direction intersecting the conveying direction (X-direction vector).

As is clear from comparison between FIG. 11A and FIG. 11B, the lines a and d belonging to the outer lines OL do not turn the turning table 6 in principle during the alignment operation so that the articles M are biased by the conveying rollers 3 in the constant biasing directions.

Specifically, in the line a on the left side of the first alignment line L1, the biasing direction (small arrows) is the right tilted direction so that the articles M approach the first alignment line L1 from an oblique direction. In the line d on the right side of the first alignment line L1, the biasing direction (small arrows) is the left tilted direction so that the articles M approach the first alignment line L1 from an oblique direction.

The tilt angle of the biasing direction (Small allows) of the conveying rollers 3 in the lines a and d belonging to the outer lines OL is fixed at about 20 to 40 degrees relative to the direction from the cargo handling area 35 to the article alignment area 36 side. In the present embodiment, the tilt angle of the biasing directions is fixed at 30 degrees.

Vectors in the biasing directions of the conveying rollers 3 in the lines a and d belonging to the outer lines OL have a tilt angle of 30 degrees with respect to the main traveling direction, and are divided into a vector component in the main traveling direction along the first alignment line L1 (Y direction vector) and a vector component in the direction toward the first alignment line L1 (X direction vector).

On the other hand, in the lines b and c belonging to the inner lines IL, the turning tables 6 are rotated and the tilt angles of the turning tables 6 are changed frequently, as can be seen by comparing FIGS. 11A and 11B. Therefore, the postures of the conveying rollers 3 in the lines b and c belonging to the inner lines IL change so that the biasing directions of the articles M change accordingly.

The biasing directions of the conveying rollers 3 belonging to the inner lines IL also include the vector component in the direction along the first alignment line L1 and the vector component in the direction toward the first alignment line L1. In other words, the biasing directions of the conveying rollers 3 (small arrows) include the vector component in the direction along the first alignment line L1 (Y direction vector), and the vector component in the direction toward the first alignment line L1 (X direction vector).

As for inner lines IL, the line b on the left side (left area LA) of the first alignment line L1 takes a right tilted posture so that the articles M approach the first alignment line L1 from an oblique direction, and has a change in the right tilt angle. That is, the line b in the left area LA does not tilt to the left, but has a change in the angle in the range of right tilt.

As for inner lines IL, the line c on the right side (right area RA) of the first alignment line L1 takes a left tilted posture so that the articles M approach the first alignment line L1 from an oblique direction, and has a change in the left tilt angle. That is, the line c in the right area RA does not tilt to the right, but has a change in the angle in the range of left tilt.

In the present embodiment, the conveying cells 1 in the lines b and c belonging to the inner lines IL bias the articles M at a tilt angle of 20 degrees at a certain timing (FIG. 11A), and bias the articles M at a tilt angle of 45 degrees at the next timing (FIG. 11B).

In the present embodiment, since the biasing direction of the conveying rollers 3 in the line c is an a tilt angle of 20 degrees or 45 degrees with respect to the main traveling direction, the biasing direction always includes the vector component in the direction along the first alignment line L1 and the vector component in the direction toward the first alignment line L1. That is, the vector of the biasing direction always has a tilt angle with respect to the main traveling direction, and divided into the vector component in the main traveling direction along the first alignment line L1 (Y direction vector) and the vector component in the direction toward the first alignment line L1 (X direction vector).

However, the amount of change in the biasing direction is arbitrary. If the biasing direction has tilt angles of 0 degrees and 40 degrees with respect to the main traveling direction, for example, the biasing direction of the biasing unit always includes the vector component in the direction along the first alignment line L1 and temporarily includes the vector in the direction toward the first alignment line L1.

As is clear from the comparison between FIG. 11A and FIG. 11B, in the present embodiment, the conveying rollers 3 in the inner lines IL bias the articles M at an acuter angle and a more obtuse angle than the tilt angles of the conveying rollers 3 in the lines a and d belonging to the outer lines OL.

That is, the conveying rollers 3 in the inner lines IL turn from a gently tilted state as shown in FIG. 11A, pass through a state at the same tilt angle as in the lines a and d belonging to the outer lines OL, and change to a state at an acuter tilt angle as shown in FIG. 11B. The conveying rollers 3 returns from the acute tilt angle to the gentle tilt angle.

The conveying cells 1 in the inner lines IL move as if to shake a head. The biasing directions from the conveying cells 1 to the articles M form an inverted V-shape with respect to the first alignment line L1, and the opening angle thereof changes.

In the present embodiment, the conveying cells 1 (biasing units) arranged in the inner lines IL near the first alignment line L1 have varying biasing directions, and the conveying cells 1 arranged in the outer lines OL far from the first alignment line L1 have constant biasing directions.

In the alignment operation, the conveying cells 1 are operated in the intermittent operation mode. Therefore, in the alignment operation, when the article M is on a specific conveying cell 1 and there is no article M on the conveying cell 1 in front of the specific conveying cell 1 in the traveling direction, the traveling motor of the specific conveying cell 1 is driven to move the article M on the specific conveying cell 1. Further, also when the conveying cell 1 in front of the specific conveying cell 1 in the traveling direction is in a state of conveying the article M, the specific conveying cell 1 is driven to move the article M on the own conveying cell 1.

Figure 10A:
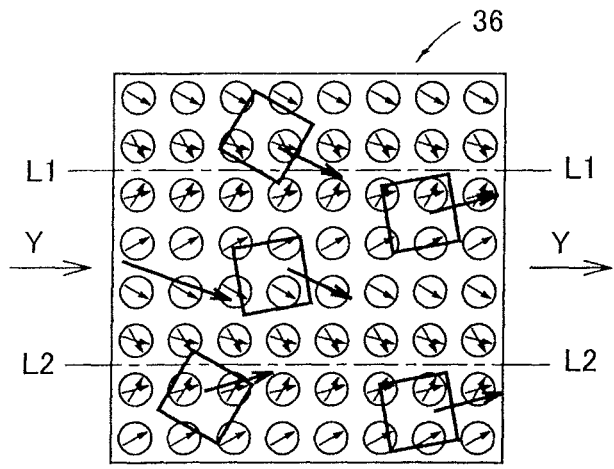
FIGS. 10A to 10C are explanatory diagrams showing the operations of the article alignment area.

A group of articles is carried into the article alignment area 36 from the preceding cargo handling area 35. In the preceding cargo handling area 35, the overlaps among the articles M have been eliminated, but the articles M are randomly scattered all over the cargo handling area 35. Therefore, the group of articles is carried into the article alignment area 36 while being widely scattered as shown in FIG. 10A.

The articles M having entered the article alignment area 36 generally advance toward the carry-out area 37 (main traveling direction/Y direction). However, their movement loci are not linear, and the articles M are moved in zigzag with small changes in the traveling direction as shown in FIGS. 12 and 15.

Figure 12A:
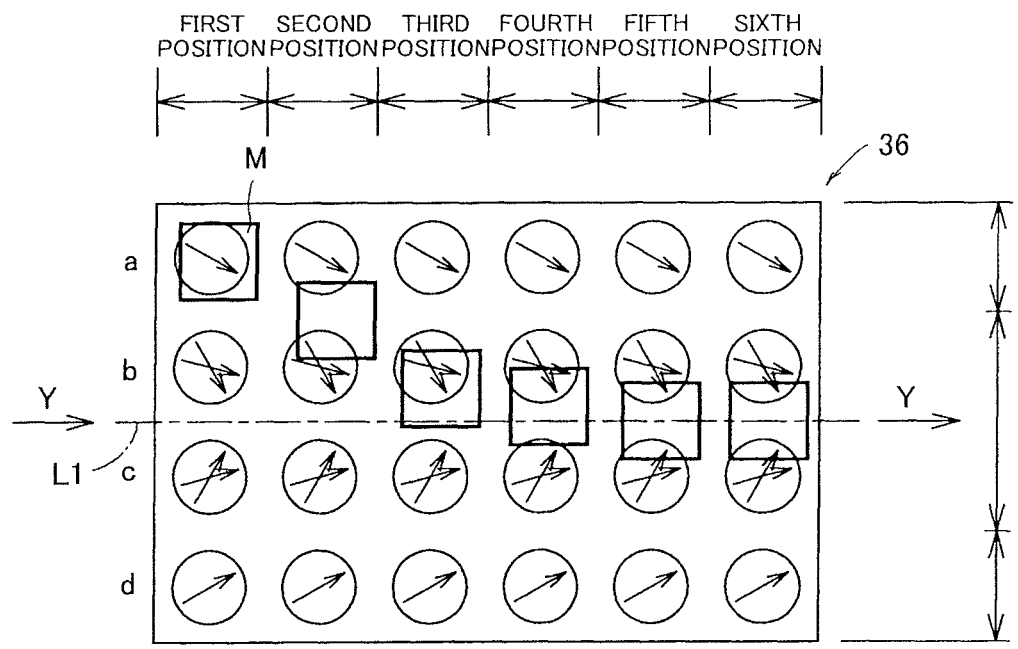
FIG. 12A is a plan view of the article alignment area showing positions of articles.
Figure 12B:
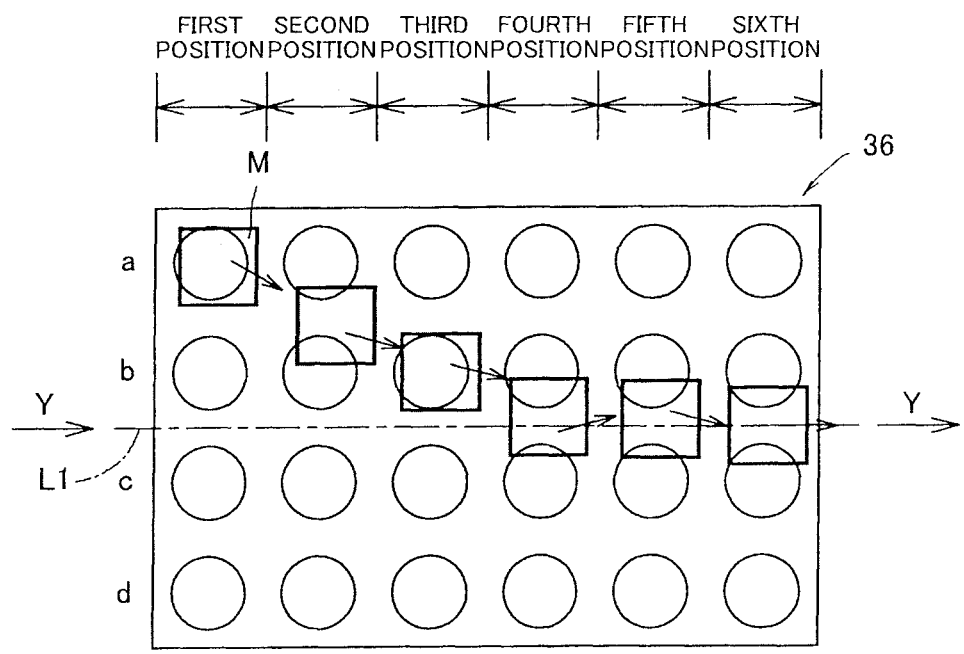
FIG. 12B is an explanatory diagram showing biasing directions of the articles caused by the conveying cells in case of FIG. 12A.
Figure 13A:
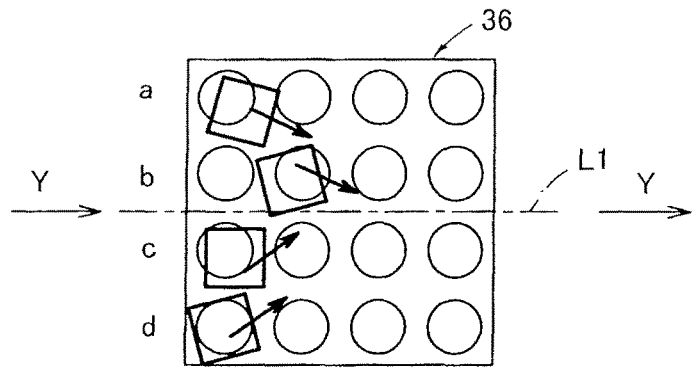
FIGS. 13A to 13D are explanatory diagrams showing the behavior of articles in the article alignment area.
Figure 13B:
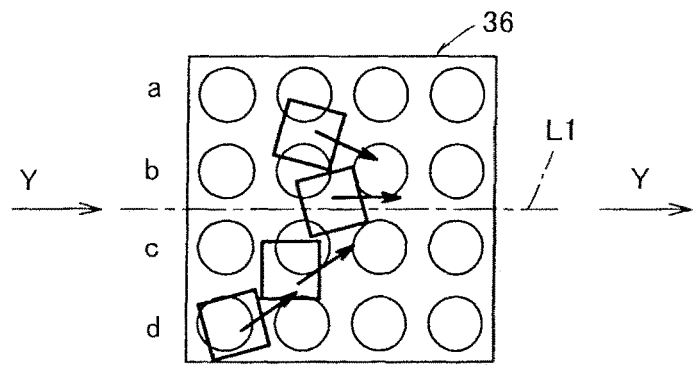
Figure 13C:
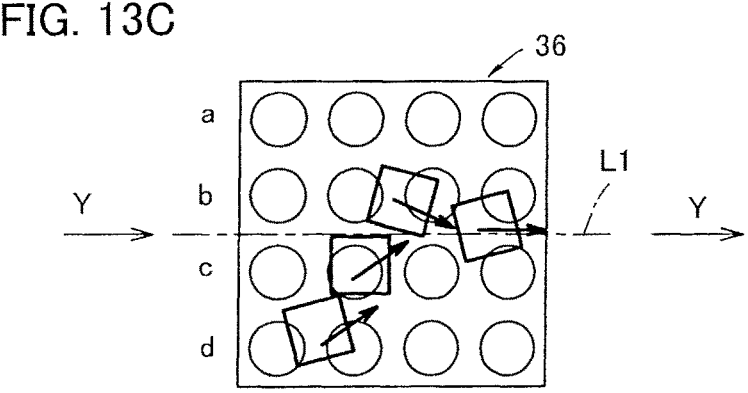
Figure 13D:
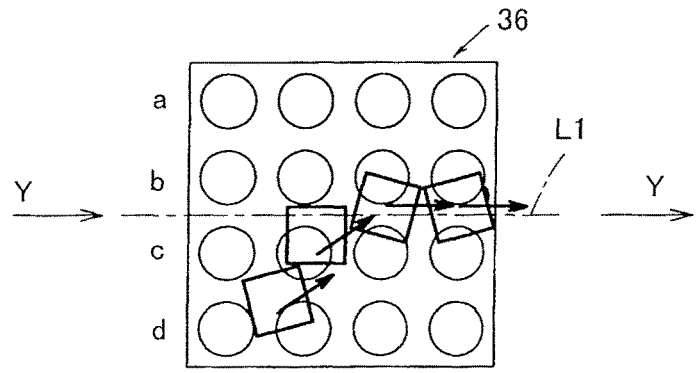
Figure 15:
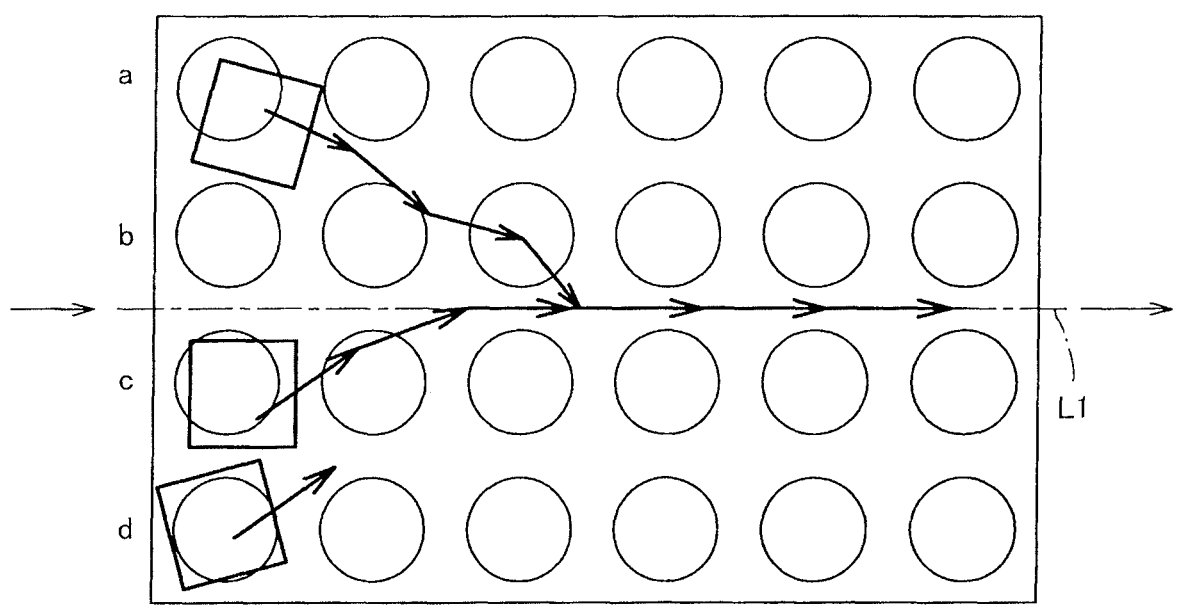
FIG. 15 is an explanatory diagram showing the movement tracks of articles in the article alignment area.

More specifically, as shown in FIGS. 12 and 15, the articles M having entered the article alignment area 36 macroscopically advance diagonally toward the first alignment line L1, and microscopically run in zigzag with small changes in the traveling direction.

For example, like the article M shown in FIG. 12A, the article M initially located on the line a belonging to the inner line IL at a first position in the Y direction receives a biasing force from the conveying roller 3 in the line a in the direction at a tilt angle of 30 degrees. As a result, the article M moves diagonally forward at the tilt angle of 30 degrees.

Assuming that the article M moves to a second position in the Y direction and rides on both the conveying roller 3 in the line a and the conveying roller 3 in the line b, the conveying roller 3 in the line a biases the article M in the direction at the tilt angle of 30 degrees, while the conveying roller 3 in the line b biases the article M at a tilt angle of 20 degrees or 45 degrees. If it is the timing for the conveying roller 3 in the line b to bias the article M at an angle of 20 degrees, the article M is biased in the combined vector direction of the biasing directions of the conveying rollers 3 in the lines a and b. Therefore, the article M is biased diagonally at an angle smaller than 30 degrees. Therefore, the article M moves in a direction different from the traveling direction in which the article M advanced from the first position to the second position in the Y direction.

Assuming that the article M moves to a third position in the Y direction and is placed on the conveying rollers 3 in the line b, the conveying roller 3 in the line b biases the article M at a tilt angle of 20 degrees or 45 degrees. If it is the timing for the conveying roller 3 in the line b to bias the article M at an angle of 45 degrees, the article M is biased at the tilt angle of 45 degrees in the biasing direction of the conveying roller 3 in the line b. Therefore, the article M moves in a direction different from the traveling direction in which the article M advanced from the second position to the third position.

In this way, the article M advances to a fourth position and to a fifth position in the Y direction in a swinging state while changing its traveling direction little by little, and finally sits on the first alignment line L1.

The movement locus of the article M is as shown in FIG. 15, for example, and advances obliquely toward the first alignment line L1 while changing its traveling direction little by little, and finally sits on the first alignment line L1 and advances in the main traveling direction.

In the present embodiment, the biasing directions of the conveying rollers 3 are reversed in the forward and reverse directions with respect to the first alignment line L1 with the first alignment line L1 as a boundary. That is, the biasing directions of the conveying rollers 3 are different in tilt angle with respect to the main traveling direction (Y direction) with the first alignment line L1 or its vicinity as a boundary. That is, in the left area LA, the biasing directions of the conveying rollers 3 are right tilt directions, and in the right area RA, the biasing directions of the conveying rollers 3 are left tilt directions as shown in FIGS. 10, 11, and 12, so that the tilt angles with respect to the main traveling direction are different line-symmetrically.

Therefore, the articles M on the first alignment line L1 are biased from the left side by the conveying rollers 3 in the left area LA toward the first alignment line L1 and are biased from the right side by the conveying rollers 3 in the right area RA toward the first alignment line L1 at the same time.

Figure 10B:
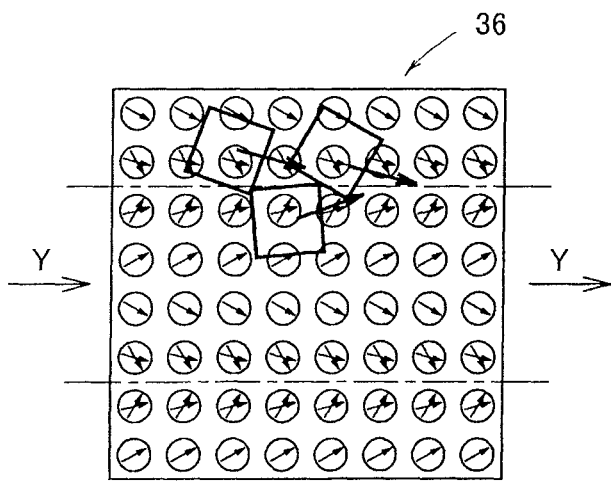

As a result, as shown in FIGS. 10 and 13, the articles M are biased from both sides of the first alignment line L1 toward the first alignment line L1 at the same time, and move forward without deviating from the first alignment line L1.

The biasing directions of the conveying cells 1 in the inner lines IL on which the articles M are placed change, but the timing for change differs between the left area LA and the right area RA. Therefore, the articles M move forward while swinging.

As described above, the plurality of articles M is carried into the article alignment area 36 in a widely scattered state. As shown in FIGS. 13 and 15, each article M moves toward the first alignment line L1 and the second alignment line L2 while swinging.

Figure 14A:
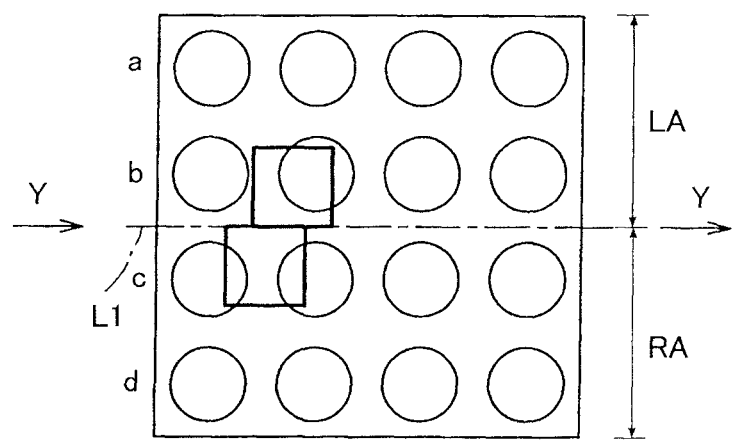
FIGS. 14A to 14C are explanatory diagrams describing the behavior of articles when colliding with each other near an alignment line in the article alignment area.

The group of randomly scattered articles approaches the first alignment line L1 from both the left area LA and the right area RA, and thus the articles may collide with each other near the first alignment line L1 as shown in FIG. 14A.

In the present embodiment, the articles M approach the first alignment line L1 while swinging. The articles M also swing on the first alignment line L1. The timing at which the articles M swing varies individually.

Figure 14B:
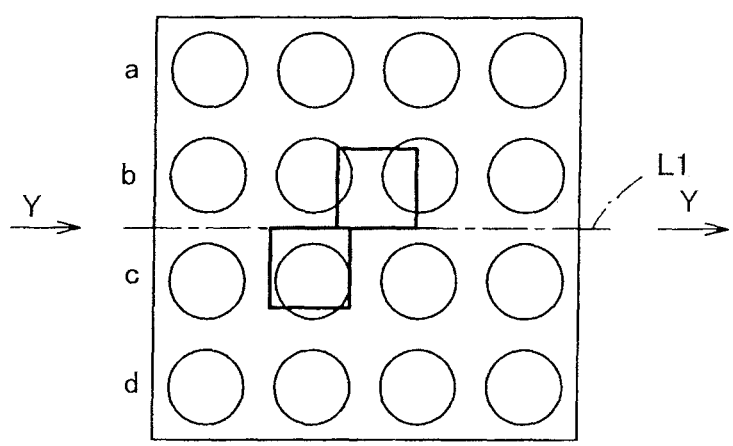
Figure 14C:
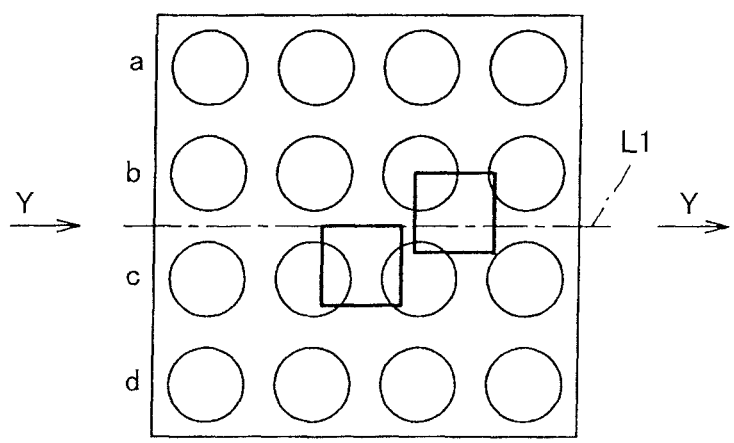

Therefore, when the articles M collide near the first alignment line L1, one of the articles M precedes and the other follows depending on their swings and shift in the timing of the swings as shown in FIGS. 14B and 14C. Otherwise, the article M cuts into the queue.

The articles M may also collide with each other at a position not in the vicinity of the first alignment line L1. Even in this case, one of the articles M precedes and the other follows depending on their swings and shift in the timing of the swings almost without causing a jam as shown in FIGS. 14B and 14C.

Figure 10C:
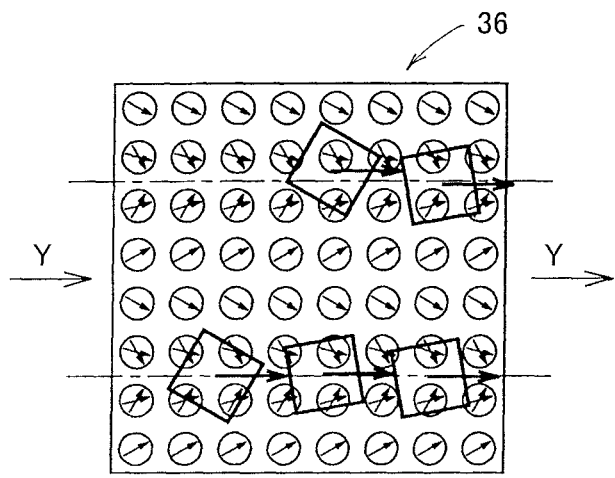

As a result, all the articles M are arranged on the first alignment line L1 as shown in FIG. 10C.

In the article alignment device 31 of the present embodiment, the articles M are moved by the biasing unit biasing the bottom surfaces of the articles M. The biasing direction of the biasing unit includes a vector component in the direction along the alignment lines L1 and L2 (Y direction), and includes a vector component in the direction that advances constantly or temporarily toward the alignment lines (X direction). The biasing direction of the biasing unit is changed while the articles M are being conveyed, so that the articles M are moved in a specific traveling direction while being swung.

In the article alignment device 31 of the present embodiment, the articles M can be arranged along a predetermined alignment line by the operations of the conveying cells 1 embedded in the article placement surface 32. The article alignment device 31 of the present embodiment is safe because there are no obstacles or moving guides on the conveyance path.

The article alignment device 31 of the present embodiment can be used for any size and shape of articles to be aligned, and can align articles on a predetermined alignment line even if the sizes and shapes of the articles are not uniform.

The article alignment area 36 is the conveying device 2 that conveys the articles M in a predetermined direction, and has a plurality of biasing unit (conveying rollers 3) that biases the bottom surfaces of the articles M to move the articles M. The conveying rollers 3 can change the biasing direction of the articles M. The biasing direction of the conveying rollers 3 includes a vector component in a direction along the Y direction, which is the conveying direction, and also includes a vector component in a direction that constantly or temporarily intersects with the conveying direction. Then, the article alignment area 36 moves the articles in a predetermined direction while swinging the articles M by changing the biasing direction.

[Article Separation Area]

In the present embodiment, the first half of the article alignment area 36 also functions as the article separation area 38.

Figure 16A:
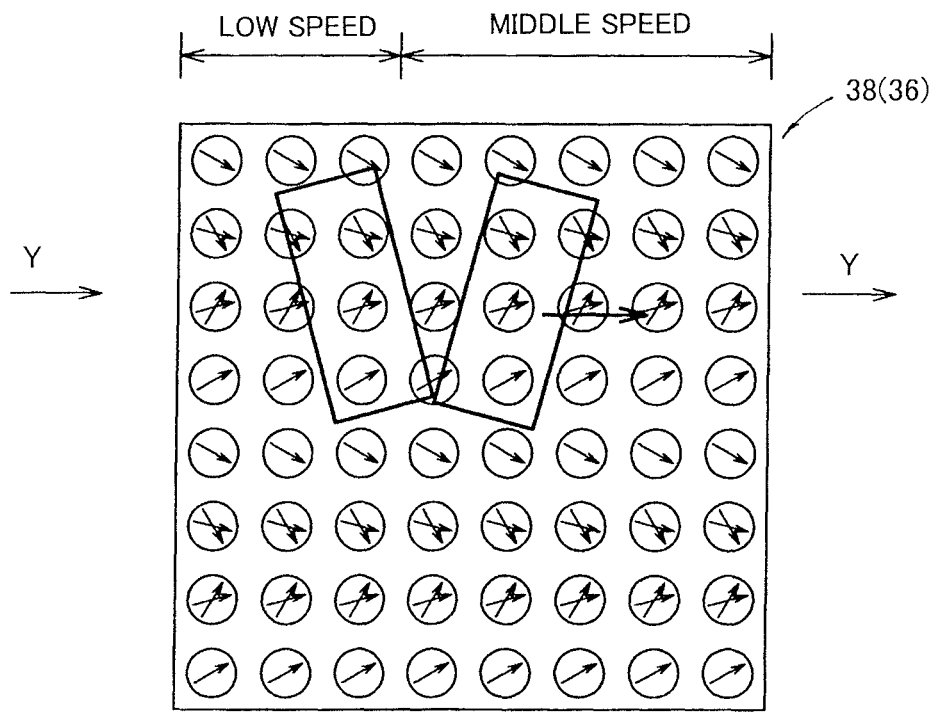
FIGS. 16A and 16B are explanatory diagrams showing the action of a separation area.

In the article alignment area 36, the conveying cells 1 are operated in the intermittent operation mode as described above. In the first half of the article separation area, the conveying cells 1 on the front side in the traveling direction and the conveying cells 1 on the rear side in the traveling direction are different in the rotation speed of the conveying rollers 3 as shown in FIG. 16A. The rotation speed of the conveying rollers 3 in the conveying cells 1 on the rear side is slightly slower.

Figure 17A:
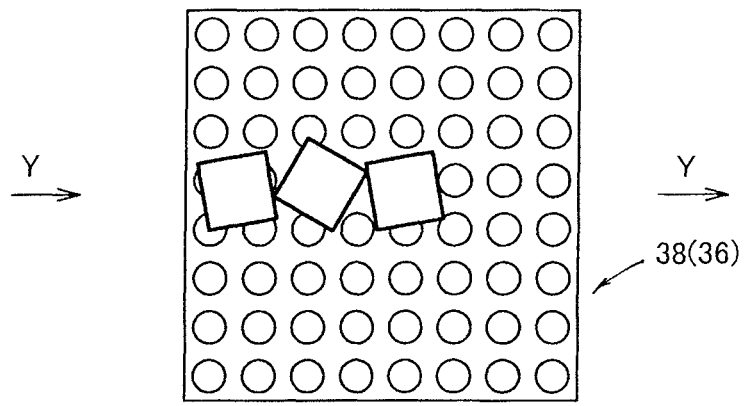
FIGS. 17A to 17C are explanatory diagrams showing the behavior of articles in the separation area.
Figure 17B:
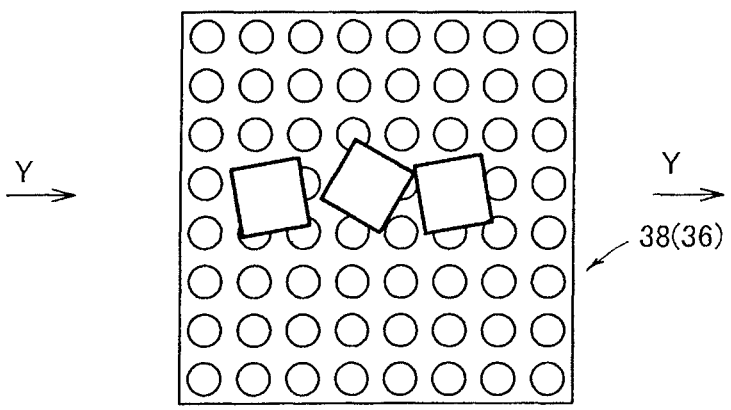
Figure 17C:
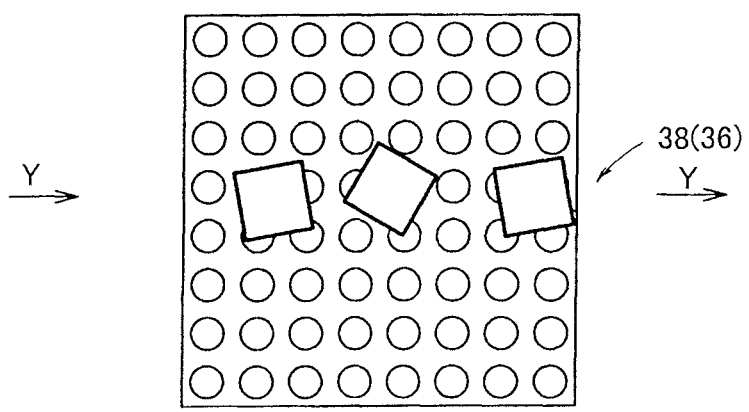

Therefore, when the articles M are in planar contact as shown in FIG. 17A, the article M on the leading side advances quickly, so that the spacing between the articles M gradually increases as shown in FIGS. 17B and 17C.

Figure 16B:
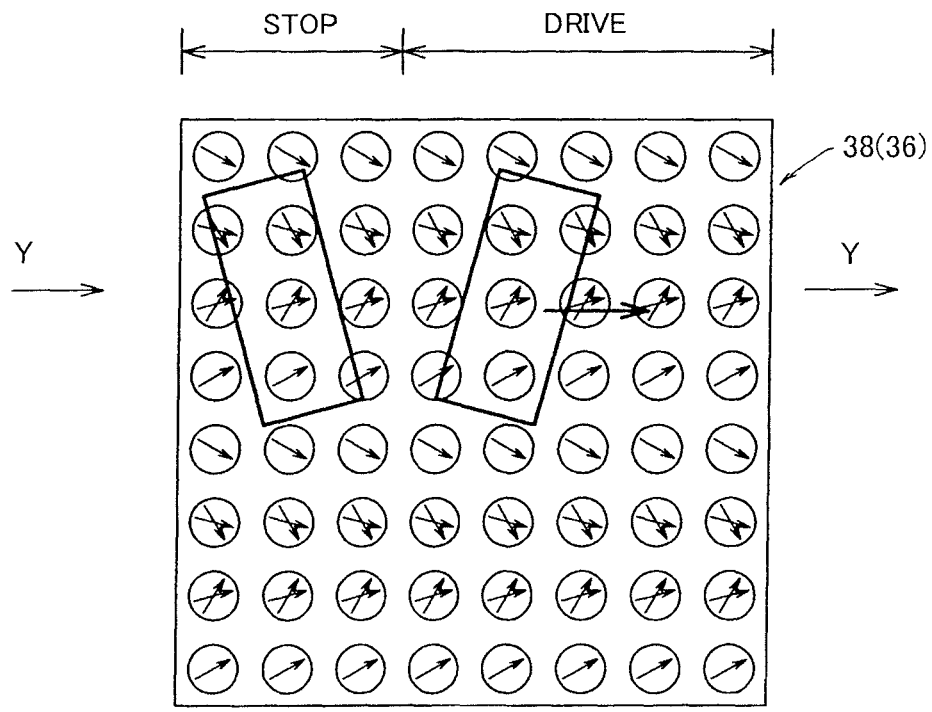

As another measure, the driving of the conveying cells 1 on the rear side may be slightly delayed as shown in FIG. 16B. According to this measure, even if the conveying cells 1 on the front side in the traveling direction move to advance the article M on the front side, the article M on the rear side stays in place for a while. Therefore, the spacing between the articles M gradually increases as shown in FIG. 16A.

In the above-described embodiment, the articles M can be arranged in two lines on the conveying device 2, but the number of lines of the articles M is arbitrary and may be one line or three or more lines.

In the above-described embodiment, the article alignment area 36 is divided into the first area and the second area, and each area includes a group of conveying cells 1 in four lines. The conveying cells 1 are distributed across the alignment lines L1 and L2, and there are two lines of conveying cell groups on each side of the alignment lines L1 and L2.

However, the present invention is not limited to this configuration, and the article alignment area 36 may be divided into three or more areas. The number of lines of the conveying cells 1 belonging to each area is arbitrary, and may be two or five or more. The number of lines belonging to the first area and the second area may be different.

In the above-described embodiment, the inner lines IL and the outer lines OL are each two lines, but the numbers of lines included in the inner lines IL and the outer lines OL are arbitrary.

In the above-described embodiment, the biasing direction of the articles M changes in the inner lines IL and the biasing direction in the outer lines OL is constant, but the biasing direction may change in all the areas. Also, the amount of change in the biasing direction may differ depending on the location.

[Carry-Out Area]

Figure 19A:
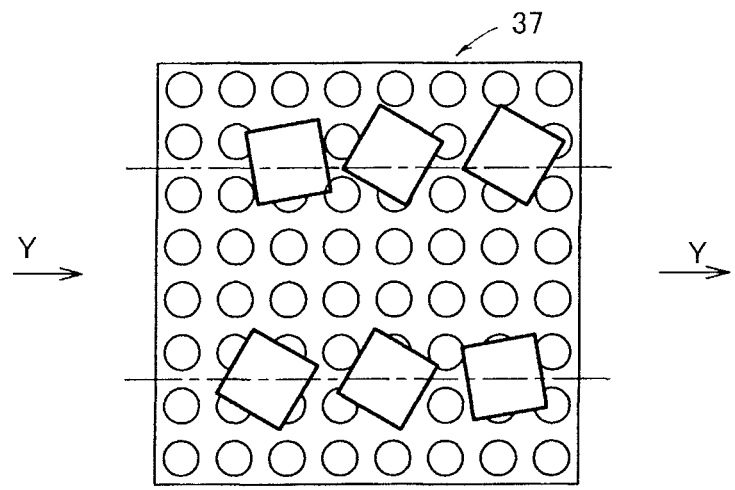
FIGS. 19A to 19C are explanatory diagrams showing the behavior of articles in the carryout area.

In the carry-out area 37, the articles M are moved in a fast-in-fast-out way, as shown in FIG. 19.

The carry-out area 37 is an area on the downstream side of the article alignment area 36, and the articles M are aligned on the alignment lines L1 and L2.

Figure 18:
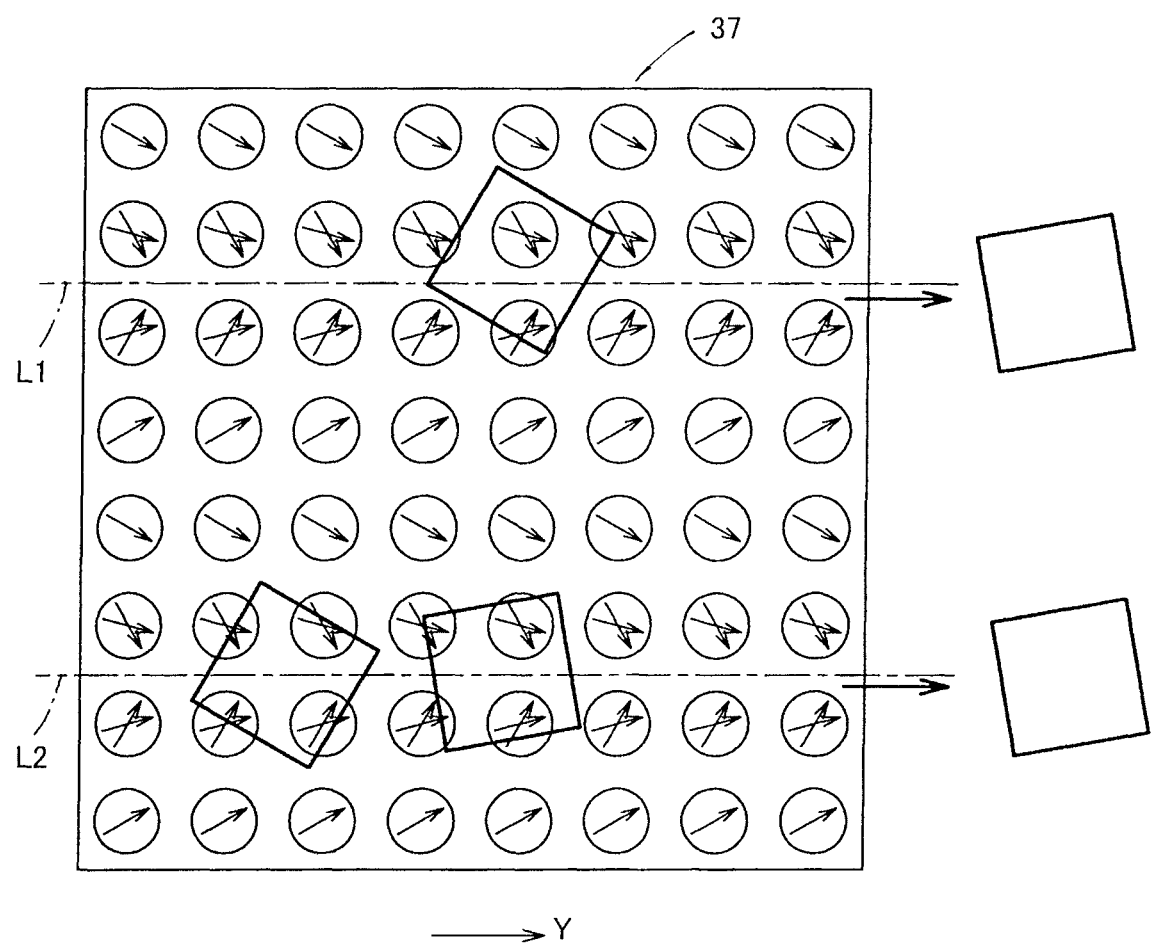
FIG. 18 is an explanatory diagram showing the action of a carry-out area.
Figure 19B:
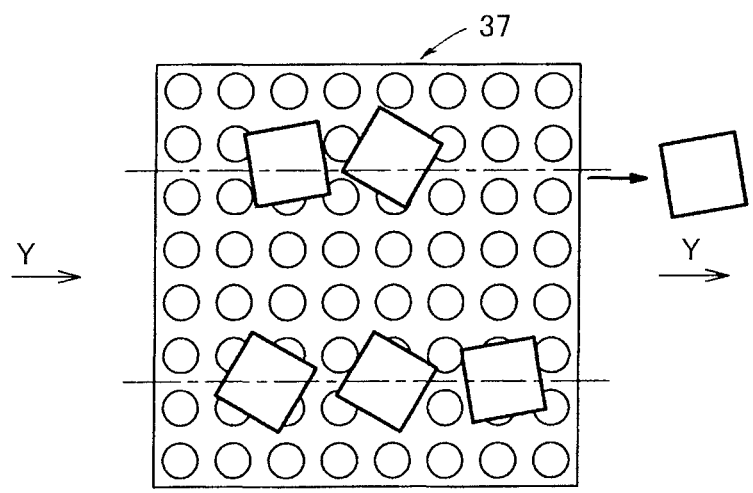

The leading end of the carry-out area 37 is also the leading end of the conveying device 2. The conveying cells 1 at the leading end or in the vicinity thereof are normally in a stopped state and are operated by a signal from another device or a manually input signal. The conveying cells 1 at the positions other than the leading end part are operated in the intermittent operation mode. Therefore, in the carry-out area 37, the articles M are densely arranged in series, and when the leading article M is discharged as shown in FIGS. 18 and 19B, the subsequent article M enters the leading end position as shown in FIG. 19C.

Figure 19C:
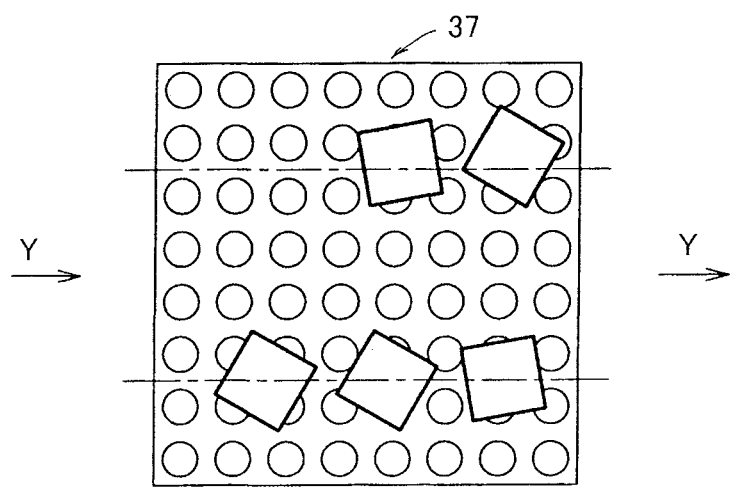

As a result, the article M is placed on standby at the leading end of the carry-out area 37, waiting for an opportunity for carrying out as shown in FIG. 19C.

[Others]

In the embodiment described above, a large number of conveying cells 1 are arranged in a planar manner to form the article placement surface 32, and the conveying cells 1 each have both the movement function of moving the articles M and the biasing direction changing function of changing the biasing direction. However, all the cells do not need to have these functions but some may have only the movement function and others may have only the biasing direction changing function.

Figure 22:
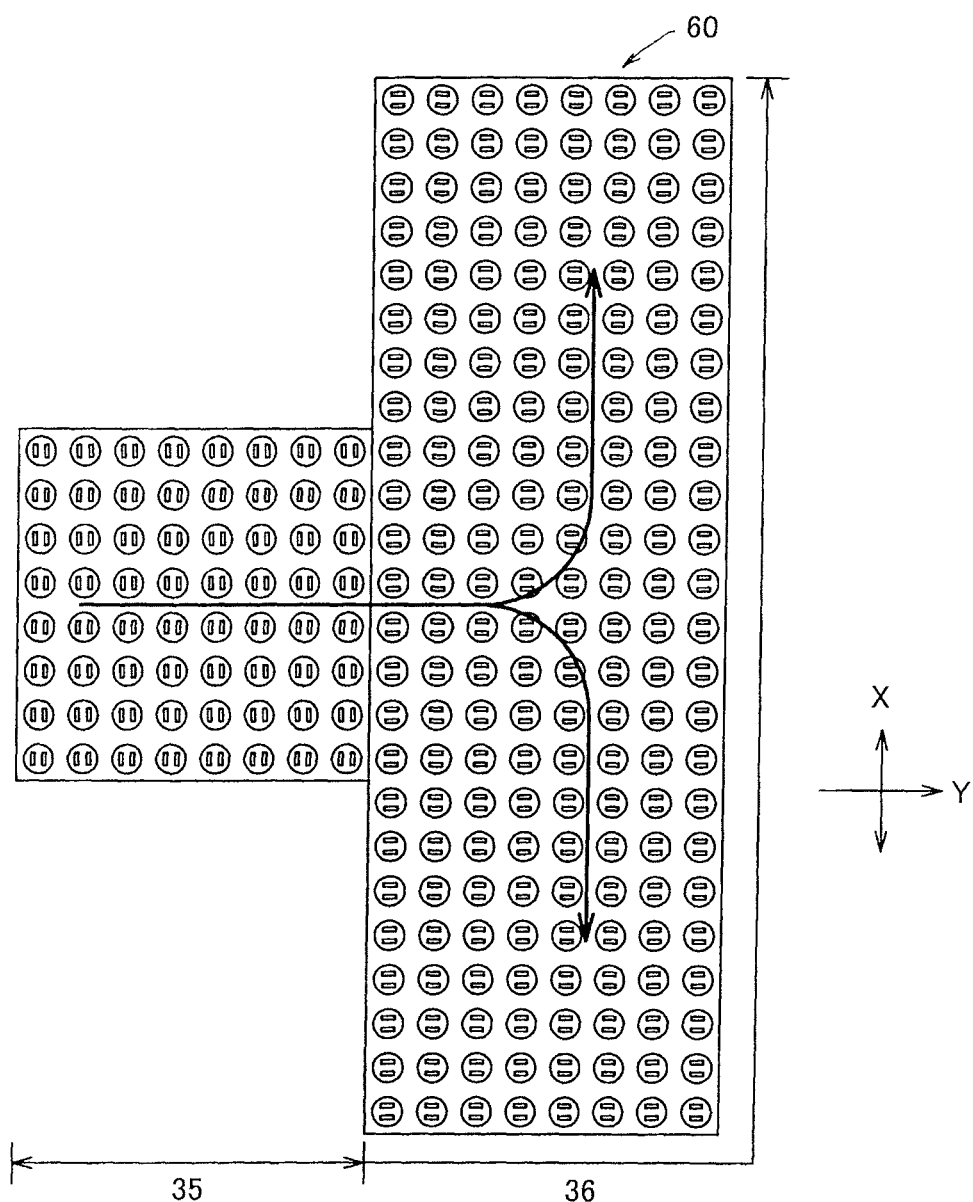
FIG. 22 is a plan view of a conveying device (cargo handling device/article alignment device) according to another embodiment of the present invention.

In the above-described embodiment, all the articles M are conveyed in the Y direction, which is the main traveling direction. However, articles may be distributed in a plurality of directions as in a conveying device 60 illustrated in FIG. 22.

According to this configuration, the main traveling direction is branched in the middle and divided into two directions.

In the conveying device 60, the articles having been entered into an article alignment area 36 are turned by 90 degrees into the X direction that is a conveying direction, and are advanced in routes separated along the vertical direction shown in the drawing.

Therefore, in the article alignment area 36, the main traveling direction includes two directions, that is, the positive X direction and the negative X direction.

The biasing direction of the conveying rollers 3 in the region shown in the upper part of the drawing includes a vector component in the direction along the positive X direction, which is the conveying direction, and a vector component in the Y direction that constantly or temporarily intersects with the conveying direction. Then, the article alignment area 36 moves the articles M in the positive X direction while swinging the articles M by changing the biasing direction.

On the other hand, the biasing direction of the conveying rollers 3 in the region shown in the lower part of the drawing includes a vector component in the direction along the negative X direction, which is the conveying direction, and a vector component in the Y direction that constantly or temporarily intersects with the conveying direction. Then, the article alignment area 36 moves the articles M in the negative X direction while swinging the articles M by changing the biasing direction.

In the above-described embodiment, the conveying device 2 has the article placement surface 32, and can advance the articles M arbitrarily in the vertical and horizontal directions or the diagonal direction. Thus, the traveling direction of the articles M on the article placement surface 32 is arbitrary, so that the articles can be advanced in any direction. Therefore, the main traveling direction of the articles M can be arbitrarily set according to the intended use.

EXPLANATION OF REFERENCE SIGNS

1: Conveying cell
2, 60: Conveying device
3: Conveying roller
6: Turning table
30: Cargo handling device
31: Article alignment device
32: Article placement surface
35: Cargo handling area
36: Article alignment area
37: Carry-out area
38: Article separation area
M: Article
L1: First alignment line
L2: Second alignment line
IL: Inner line
OL: Outer line
LA: Left area
RA: Right area

The invention claimed is:

1. A cargo handling device that eliminates overlaps among a plurality of articles loaded into the cargo handling device, comprising an article placement surface for placing the articles,
   wherein the cargo handling device performs a cargo handling operation that turns and/or rotates the articles on the article placement surface to thereby generate centrifugal forces on the articles to thereby eliminate the overlaps.

2. The cargo handling device according to claim 1, further comprising a plurality of conveying cells in a planar manner to constitute the article placement surface,
   wherein the conveying cells include a first conveying cell with a movement function of moving the articles and a second conveying cell with a biasing-direction changing function of changing a biasing direction.

3. The cargo handling device according to claim 1, comprising a discharge number detection unit configured to detect a number of the articles discharged from the cargo handling device,
   wherein the cargo handling device stops the cargo handling operation when the number of the articles detected by the discharge number detection unit reaches to a predetermined number.

4. The cargo handling device according to claim 1, wherein conveying speed, rotation speed, turning speed, or turning radius of the articles are changeable.

5. The cargo handling device according to claim 1, wherein the cargo handling device is configured to perform the cargo handling operation while moving the articles in one direction.

6. The cargo handling device according to claim 1, comprising:
   a cargo handling area configured to perform the cargo handling operation; and
   an article alignment area located downstream of the cargo handling area,
   wherein the cargo handling device is configured to align the articles having undergone the cargo handling operation, on a predetermined alignment line.

7. The cargo handling device according to claim 1, comprising:
   a cargo handling area configured to perform the cargo handling operation; and
   an article separation area located downstream of the cargo handling area,
   wherein in the article separation area the cargo handling device is configured to convey the articles at different conveying speeds in one direction to separate the articles from each other in a traveling direction.

8. The cargo handling device according to claim 1, comprising:
   a cargo handling area configured to perform the cargo handling operation; and
   an article separation area located downstream of the cargo handling area,
   wherein in the article separation area the cargo handling device is configured to convey the articles in one direction with temporarily stopping the articles or temporarily stopping a conveying speed to separate the articles from each other in a traveling direction.

9. The cargo handling device according to claim 1, comprising:
   a cargo handling area configured to perform the cargo handling operation; and a swinging area located downstream of the cargo handling area, wherein in the swing area the cargo handling device changes a traveling direction of the articles little by little to convey the articles in one direction while swinging.

10. A cargo handling method for eliminating overlaps among articles, the method comprising:

placing articles on a predetermined placement surface; and turning and/or rotating the articles on the predetermined placement surface to thereby generate centrifugal forces on the articles to thereby eliminate the overlaps among the articles.

* * * * *